(12) United States Patent
Michel et al.

(10) Patent No.: US 11,099,016 B2
(45) Date of Patent: Aug. 24, 2021

(54) SYSTEM AND METHOD FOR GENERATING PEDESTRIAN TOURS

(71) Applicant: NAVER CORPORATION, Gyeonggi-do (KR)

(72) Inventors: Sofia Michel, Grenoble (FR); Stéphane Clinchant, Grenoble (FR); Christophe Legras, Montbonnot-Saint-Martin (FR); Jutta Willamowski, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 138 days.

(21) Appl. No.: 16/690,608

(22) Filed: Nov. 21, 2019

(65) Prior Publication Data

US 2020/0309545 A1 Oct. 1, 2020

(30) Foreign Application Priority Data

Mar. 29, 2019 (EP) .................................... 19305425

(51) Int. Cl.
*G01C 21/34* (2006.01)
*H04W 4/024* (2018.01)
(Continued)

(52) U.S. Cl.
CPC ..... *G01C 21/3407* (2013.01); *G01C 21/3667* (2013.01); *G08G 1/005* (2013.01); *H04W 4/024* (2018.02)

(58) Field of Classification Search
CPC ........... G01C 21/3407; G01C 21/3667; H04W 4/024; G08G 1/005
See application file for complete search history.

(56) References Cited

U.S. PATENT DOCUMENTS

| 7,925,540 B1 | 4/2011 | Orttung et al. |
| 8,655,591 B2 | 2/2014 | Van Hende |
| (Continued) | | |

FOREIGN PATENT DOCUMENTS

| CN | 106203677 A | 12/2016 |
| JP | 2008128779 A | 6/2008 |
| (Continued) | | |

OTHER PUBLICATIONS

European Search Report for European Patent Application No. EP19305425 dated Oct. 1, 2019.
(Continued)

*Primary Examiner* — Hussein Elchanti

(57) ABSTRACT

Generating a pedestrian tour includes: receiving a query from a user device via a network, the query indicative of a request for a pedestrian tour and including a location and preferences including a target length for the pedestrian tour; obtaining a graph of a geographical area around the location of the user device, the graph including nodes indicative of path crossings and arcs indicative of paths connecting pairs of the nodes; determining scores for the arcs based on characteristics of the arcs, respectively, and the preferences; selecting connecting ones of the arcs based on the scores of the connecting ones of the arcs, lengths of the selected connecting ones of the arcs, and the target length; adding the selected connecting ones of the arcs to the pedestrian tour to initialize the pedestrian tour; and transmitting the pedestrian tour to the user device via the network for display.

34 Claims, 29 Drawing Sheets
(23 of 29 Drawing Sheet(s) Filed in Color)

(51) Int. Cl.
  *G01C 21/36* (2006.01)
  *G08G 1/005* (2006.01)

(56) References Cited

U.S. PATENT DOCUMENTS

| | | | |
|---|---|---|---|
| 8,712,684 | B2 | 4/2014 | Van Hende |
| 8,768,613 | B2 | 7/2014 | Bamba |
| 8,825,370 | B2 | 9/2014 | Hu et al. |
| 8,942,918 | B2 | 1/2015 | Hansen et al. |
| 8,996,312 | B1 | 3/2015 | Freund et al. |
| 9,228,850 | B2 | 1/2016 | Singh |
| 9,494,440 | B2 | 11/2016 | Sofinski et al. |
| 9,694,882 | B2 | 7/2017 | Lee et al. |
| 2002/0128773 | A1 | 9/2002 | Chowanic et al. |
| 2003/0083806 | A1* | 5/2003 | Odinak .............. G01C 21/3676 701/420 |
| 2006/0206258 | A1 | 9/2006 | Brooks |
| 2008/0319773 | A1 | 12/2008 | Wong et al. |
| 2010/0312466 | A1 | 12/2010 | Katzer et al. |
| 2011/0238609 | A1* | 9/2011 | Aben ...................... G01C 21/26 706/50 |
| 2012/0136566 | A1 | 5/2012 | Bamba |
| 2013/0103313 | A1 | 4/2013 | Moore et al. |
| 2014/0100905 | A1* | 4/2014 | Alexander ......... G06Q 30/0613 705/7.19 |
| 2014/0107916 | A1* | 4/2014 | Urup ...................... G01C 21/20 701/425 |
| 2014/0248911 | A1* | 9/2014 | Rouda, Jr. ............. H04W 4/021 455/456.3 |
| 2014/0303892 | A1 | 10/2014 | Morlock |
| 2014/0317511 | A1* | 10/2014 | Bailiang .............. G09B 29/106 715/730 |
| 2014/0347973 | A1* | 11/2014 | Yu ........................ H04W 24/04 370/216 |
| 2015/0160026 | A1 | 6/2015 | Kitchel |
| 2016/0332384 | A1* | 11/2016 | De Pena ................ B33Y 30/00 |
| 2017/0131109 | A1* | 5/2017 | Chien ..................... G06F 16/29 |
| 2020/0119900 | A1* | 4/2020 | Lai ........................ H04L 5/1438 |
| 2020/0193335 | A1* | 6/2020 | Sekhar ............... G06Q 30/0282 |

FOREIGN PATENT DOCUMENTS

| | | |
|---|---|---|
| JP | 201350405 A | 3/2013 |
| JP | 2013101010 A | 5/2013 |
| JP | 201840712 A | 3/2018 |
| WO | WO-2015032975 A1 | 3/2015 |

OTHER PUBLICATIONS

Vicente Campos et al: "GRASP with path relinking for the orienteering problem", Journal of the Operational Research Society., vol. 65, No. 12, Dec. 1, 2014 (Dec. 1, 2014), pp. 1800-1818, XP055627806, GB ISSN: 0160-5682, DOI: 10.1057/jors.2013.156.
"Graph Theory/Definitions"; Wikipedia; Last edited Jul. 1, 2017; https://en.wikipedia.org/wiki/Graph_Theory/Definitions.
"Health and fitness app usage grew 330% in just 3 years"; netimperative; Sep. 13, 2017. http://www.netimperative.com/2017/09/health-fitness-app-usage-grew-330-just-3-years/.
"How to Estimate the Time to Complete a Route"; Plot a Route—Spidersphere Ltd.; Accessed Nov. 18, 2019. https://www.plotaroute.com/tip/11/how-to-estimate-the-time-to-complete-a-route.
"Inverse Distance Weighting"; Wikipedia; Last edited Mar. 4, 2019; ttps://en.wikipedia.org/wiki/Naismith's_rule.
"Key:highway"; https://wiki.openstreetmap.org/wiki/Key:highway; Last edited Feb. 6, 2019.
"Naismith's rule"; Wikipedia; Last edited Sep. 29, 2019; https://en.wikipedia.org/wiki/Naismith's_rule.
"Route Planner (Walking, Running, Cycling)" Plot a Route; Accessed Nov. 19, 2019. https://www.plotaroute.com/routeplanner.
"Route Planner—The Best Route Planner for Cycling, Walking, Hiking and Running"; Komoot; Accessed Nov. 18, 2019. https://www.komoot.com/plan/.

"Shuttle Radar Tophography Mission"; Wikipedia; Last edited Sep. 25, 2019. https://en.wikipedia.org/wiki/Shuttle_Radar_Topography_Mission.
A Blum, S Chawla, D Karger, T Lane, A Meyerson, and M Minkoff. Approximation algorithms for orienteering and discounted-reward tsp. SIAM J Comput, 37(2):653670, 2007.
Archetti, Claudia et Speranza, M. Grazia. Arc routing problems with profits. Arc Routing: Problems, Methods, and Applications, MOS-SIAM Series on Optimization, 2013, p. 257-284.
B. Loepp, J. Ziegler, Recommending Running Routes: Framework and Demonstrator, 2nd Workshop on Recommendation in Complex Scenarios, 2018.
BD Alti®—IGN—Professional Arena; l'Information gradeur nature—Institut National De L'Information Geographique et Forestiere; English Translation. Accessed Nov. 18, 2019. http://professionnels.ign.fr/bdalti.
Berthene, April; "40 Million Smartphone Owners Use a Wellness or Fitness App"; Digital Commerce 360 | Health; Apr. 23, 2015. https://www.digitalcommerce360.com/2015/04/23/40-million-smartphone-owners-use-wellness-or-fitness-app/.
Davis, John; "The Science of Hill Running and How it Impacts Your Race Times"; Accessed Nov. 18, 2019. https://runnersconnect.net/hill-running-training/.
Feo, Thomas A., and Mauricio GC Resende. "Greedy randomized adaptive search procedures." *Journal of global optimization* 6.2 (1995): 109-133.
H. C. Lau, A. Gunawan and P. Vansteenwegen. Orienteering problem: a survey of recent variants, solution approaches and applications. European Journal of Operational Research, 255(2):315-332, 2016.
Lourenço, João Ricardo; "Open Elevation"; Accessed Nov. 18, 2019; https://open-elevation.com.
Lu, Y., & Shahabi, C. An arc orienteering algorithm to find the most scenic path on a large-scale road network. SIGSPATIAL 2015.
Lu, Y., Jossé, G., Emrich, T., Demiryurek, U., Renz, M., Shahabi, C., & Schubert, M. Scenic Routes Now: Efficiently Solving the Time-Dependent Arc Orienteering Problem. ACM 2017.
McGooking, David K. and Brewster, Stephen A.; "Investigating and Supporting Undirected Navigation for Runners"; Glasgow Interactive Systems Group—School of Computing Science; University of Glasgow; Apr. 27-May 2, 2013.
Mercier D., Schaus P., Saint-Guillain M., Deville Y. Pleasant-TourFinder: an application to find the most pleasant tour from a given location. Master Thesis, Univ Cath Louvain, 2016.
P. Vansteenwegen, W. Souffriau, and D.V. Oudheusden. The orienteering problem: A survey. European Journal of Operational Research, 209(1):1-10, 2011; Printed from Ku Leuven; 34 pages.
Quercia, Daniele, Schifanella, Rossano, Aiello, Luca Maria; "The Shortest Path to Happiness: Recommending Beautiful, Quiet, and Happy Routes in the City"; Faculty Research and Engagement Program—Yahoo Labs; HT'14 Sep. 1-4, 2014.
Rigottier, Maxence; "Why Add 1 kilometer to every 100 meters of Postivie Name?" Running Blog; Maxence Rigottier Course A Pied; Aug. 21, 2014. https://www.blog-course-a-pied.com/ajouter-1-kilometre-100-metres-denivele-positif/.
Saghyan, Vardan: How Many Runners Are in The World; Quora; Answered Jan. 15, 2017. https://www.quora.com/How-many-runners-are-in-the-world.
Truong, Charles; "Welcome to Ruptures" Ruptures—built with Sphinx; ENS Paris-Saclay, CNRS; Last updated Jan 3, 2018. http://ctruong.perso.math.cnrs.fr/ruptures-docs/build/html/index.html.
U.S. Appl. No. 16/592,943, filed Oct. 4, 2019, entitled: "System and Method for Communicating Possible Travel Paths Through Head Scanning and Sound Modulation".
Vaittinen, Tuomas, McGooking, David; "Phases of Urban Tourists' Exploratory Navigation: A Filed Study"; Department of Computer Science, Aalto University, Espoo, Finland; DIS Jun. 4-8, 2016.
Walz, Riley; Routeshuffle; Feb. 26, 2018. routeshuffle.com.
Zahradnik, Fred; How to Use the Garmin Connect Course Creator Tool—Export Routes to Your Sport GPS Device; Lifewire; updated Jul. 1, 2019. https://www.lifewire.com/garmin-connect-course-creator-tool-1683347.

(56) References Cited

OTHER PUBLICATIONS

Notification of Reasons for Refusal for corresponding Japanese Application No. 2020-058612 dated Jun. 8, 2021. Translation provided.

* cited by examiner

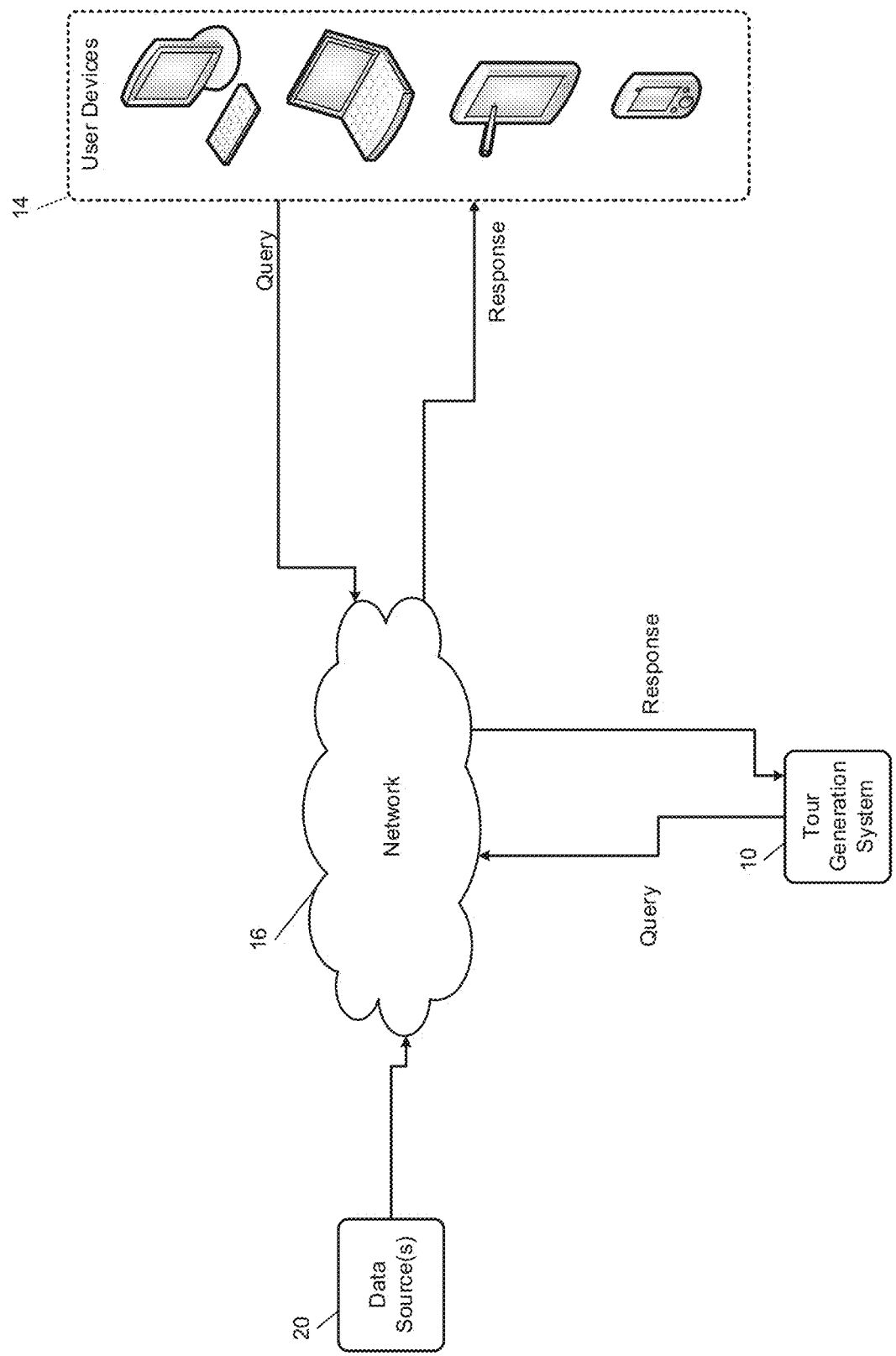

US 11,099,016 B2

SYSTEM AND METHOD FOR GENERATING PEDESTRIAN TOURS

CROSS-REFERENCE TO RELATED APPLICATIONS

This application claims the benefit of European Application No. EP19305425.1, filed on Mar. 29, 2019. The entire disclosure of the application referenced above is incorporated herein by reference.

FIELD

The present disclosure relates systems and methods for determining and providing routes for pedestrian tours and more particularly to systems and methods for determining and providing pleasant closed tours that begin and end at the same location, that may take into account elevation, that may be dynamically adjustable in length, and that may allow for flexibility in the way that a user follows a tour.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Closed tour generation can be seen as a routing problem with profits. One example of a routing problem is where a vehicle needs to serve a number of customers. In the class of routing problems with profits, the customers to serve have to be chosen from a set of potential customers, each associated with a profit. Where the customers can be seen as nodes of a graph, the problem can then be summed up as a node routing problem; if customers are on the arcs, then it is an arc routing problem.

Determining a most pleasant closed tour from a given location may be based on defining scores that express the attractiveness of each road segment and on applying an optimization algorithm to compute a closed tour of maximal score. The scores may be calculated based on Open Street Map (OSM) data and rely on complex computation methods, such as the computation of intersections of polygons to assess the environment. The score may be optimized using an external constraint programming solver (OscaR). This, however, may require significant computational resources and may be inefficient.

Another way to generate a closed tour involves respecting a given target distance by selecting intermediate waypoints in order to produce a closed tour corresponding to a specific geometric form. Satisfying the target distance, however, does not involve including tour quality criteria in scores used to produce the closed tour.

A user's experience of a tour may vary largely depending on the elevation profile of the tour, whatever its profile. For example, a typical tourist profile may prefer to minimize the difficulty of the tour, thus, minimizing the gradient (or steepness) and/or overall elevation gain. Runners, however, may want to train to improve their performance and may prefer a tour with a challenging level of elevation gain and may prefer a tour that climbs a minimum gradient (or steepness) and/or has an overall elevation gain.

SUMMARY

In a feature, a method determines a tour (i.e., a trip or voyage) with pleasant, picturesque, and/or interesting roads and/or paths which travel through areas with, for example, parks, rivers and/or vistas and which avoid areas with dense traffic and its accompanying pollution. The method includes determining the tour by penalizing main roads and highways.

In further features, the method operates efficiently to minimize the need for significant computational resources.

In further features, the method takes into account preference of the user (i.e., user preferences) for the tour, such as the length of the tour, points of interest or vistas to see along the tour, the preferred type of path (e.g., pedestrian or residential), proximity to parks and the elevation profile of the tour (gradient (or steepness), and/or overall elevation gain).

In further features, the method includes, by a processor, generating a tour that begins at and returns to the same location, the tour being personalized according to user preferences, which include a specified length and in which a geographical map including a set of crossings and roads between the crossings is arranged as a graph in which the crossings are represented as nodes and the roads between the crossings are represented as arcs, the data processor computing the tour using the graph as follows: scoring the arcs of the graph according to the user preferences; initializing the tour by adding one or more path segments; optimizing the tour by replacing some of its path segments with path segments having a path segment score representing a path segment that promotes the user preferences (e.g., by reaching the specified length within a given margin); and outputting the tour for display on a user interface.

In further features, the method is intuitive and allows the generation of better tours and offers improvements on first closed tours.

In further features, the method avoids using complex representations, such as polygons for the neighborhood of arcs.

In further features, the method provides the user with a non-trivial closed tour, without needing significant computing resources.

In further features, the method includes initializing links a first arc leaving the starting point and a second arc entering the starting point with the shortest path segment, and the initializing and setting a current node to the starting point of the tour. The optimizing further includes, while the total length of the tour is inferior to a given threshold determined by the specified length and an acceptable margin, iteratively performing the following steps: drawing a random distance d to travel on the next arc to add to the tour from a continuous probability distribution with a given set of parameters; computing the set of nodes in the graph within a given distance from the current node; if the set of nodes computed at the previous step is empty, go back to step a) eventually modifying the set of parameters, otherwise, continue performing the following steps; for each node p of the set of nodes, iteratively performing the following steps: computing the score of a computed path segment from the current node to the node p, such as the shortest path segment; verifying that there exists a path segment from the node p back to the starting point of the tour such that the total length of the tour does not exceed the specified length of the path segment; computing the score of the computed path segment; sorting the list of candidate nodes according to the score of their associated computed path; and choosing the node associated with the path segment having the highest score, or randomly choosing one from the best k paths, k being a parameter of the method.

In further features, the method further includes post processing aiming at avoiding detours in the tour, creating a list of non-conform detours by finding path segments of the tour being longer than the shortest path segment from the starting node of the path segment to the end node of the path segment by a given factor, restricting the list of non-conform detours to the path segments of the tour having a score lower than a given threshold, and/or replacing the path segments in the list of non-conform detours by their associated shortest path segments.

In further features, the method further includes: defining the initial route as a subset of arcs of the tour, for a given number of iterations, performing the following steps: for each pair of consecutive arcs AB and EF in the route, where A, B, E, and F are nodes of the graph, iteratively performing the following steps: enumerating all the feasible tour wherein the previously chosen path segment from B to E is substituted by a sequence comprising: A new arc CD; the shortest path segment from B to C; the shortest path segment from D to E; for each new path segment from B to E, iteratively performing the following steps: evaluating the score of each new tour; sorting the list of new tours by their score; choosing the new tour having the highest score, or randomly choose one from the best k tours, k being a given integer; updating the route by selecting a number of arcs of the current tour.

In further features, the method can include post processing aiming at avoiding detours in the closed tour, creating a list of non-conform detours by finding path segments of the tour being longer than the shortest path segment from the starting node of the path segment to the end node of the path segment by a given factor, restricting the list of non-conform detours to the path segments of the tour having a score lower than a given threshold; and/or replacing the path segments in the list of non-conform detours by their associated shortest path segment.

In further features, the set of preferences of the user includes elevation preferences.

In further features, the elevation preferences include: a desired elevation gain interval, said elevation gain being the sum of all positive elevation among the arcs of the tour; and/or a desired maximum steepness.

In further features, the length of the arcs of the graph can be replaced by a weight term comprising: the length of the arc; a penalty term for penalizing any arc having a steepness higher than the user's desired maximum steepness.

In further features, the method may include a hierarchical optimization method where a first objective is to achieve the desired elevation gain and a second objective is to maximize the score while keeping the elevation gain as a constraint.

In further features, before constructing a first tour, the method may include selecting an intermediary point which elevation gain from the starting point is the desired one within a given margin.

In further features, a computer program product includes code instructions to execute the method, and a computer-readable medium, on which is stored a computer program product comprising code instructions to execute the method.

In a feature, a computer executable method of generating a pedestrian tour includes: by one or more processors, receiving a query from a user device via a network, the query indicative of a request for a pedestrian tour and including (a) a location and (b) preferences including a target length for the pedestrian tour; by the one or more processors, obtaining a graph of a geographical area around the location of the user device, the graph including nodes indicative of path crossings and arcs indicative of paths connecting pairs of the nodes; by the one or more processors, determining scores for the arcs based on characteristics of the arcs (e.g., length, steepness, elevation, etc.), respectively, and the preferences; by the one or more processors, selecting connecting ones of the arcs based on the scores of the connecting ones of the arcs, lengths of the selected connecting ones of the arcs, and the target length; by the one or more processors, adding the selected connecting ones of the arcs to the pedestrian tour to initialize the pedestrian tour; and by the one or more processors, transmitting the pedestrian tour to the user device via the network for display on a user interface.

In further features, the selecting connecting ones of the arcs includes, by the one or more processors, selecting the connecting ones of the arcs such that the pedestrian tour begins at one location and ends at the one location.

In further features, determining the scores for the arcs includes, by the one or more processors, increasing the scores of ones of the arcs corresponding to at least one of foot paths, residential paths, and pedestrian paths identified in an Open Street Map (OSM) database.

In further features, determining the scores for the arcs includes, by the one or more processors, increasing the scores of ones of the arcs having a path type that is the same as a user defined type of path included in the preferences.

In further features, determining the scores for the arcs includes, by the one or more processors, decreasing the scores of ones of the arcs having path types that are different than the user defined type of path included in the preferences.

In further features, determining the scores for the arcs includes, by the one or more processors, increasing the scores of ones of the arcs located within a predetermined distance of at least one of parks, open spaces, scenic points of interest, and geographic formations identified in an Open Street Map (OSM) database.

In further features, determining the scores for the arcs includes, by the one or more processors, increasing the scores of ones of the arcs located within a predetermined distance of at least one of rivers, mountains, and hiking trails identified in an Open Street Map (OSM) database.

In further features, determining the scores for the arcs includes, by the one or more processors, decreasing the scores of ones of the arcs that are located within a predetermined distance of vehicular roads identified in an Open Street Map (OSM) database.

In further features, determining the scores for the arcs includes, by the one or more processors, increasing the scores of ones of the arcs that pass a point of interest identified in an Open Street Map (OSM) database.

In further features, determining the scores for the arcs includes, by the one or more processors, selectively decreasing the scores of two of the arcs based on an angle of intersection between the two arcs.

In further features, determining the scores for the arcs includes, by the one or more processors, decreasing the score of one of the arcs based on the tour including the one of the arcs more than once.

In further features, determining the scores for the arcs includes, by the one or more processors, decreasing the score of one of the arcs between two nodes based on the tour passing through one of the two nodes more than once.

In further features, the selecting connecting ones of the arcs includes, by the one or more processors: (a) selecting a first arc beginning at a first location and ending at an N-th location that is different than the first location; (b) identifying nodes that are within a distance d of the N-th location; (c) identifying arcs beginning at the N-th location and ending the nodes, respectively; (d) selecting one of the identified arcs based on the scores of the identified arcs, where adding the selected connecting ones of the arcs includes adding the selected one of the identified arcs to the pedestrian tour; and (e) repeating (b)-(d) until a length of the pedestrian tour is within a predetermined range of the target length included in the preferences.

In further features, by the one or more processors, randomly selecting the distance d.

In further features, by the one or more processors, increasing the distance d when zero nodes are located within the distance d of the N-th location.

In further features, (d) selecting one of the identified arcs includes, by the one or more processors: identifying k ones of the identified arcs having the k highest scores, where k is an integer greater than 1; and randomly selecting the one of the identified arcs from the k ones of the identified arcs.

In further features, (d) selecting one of the identified arcs includes, by the one or more processors, selecting the one of the identified arcs having the highest score.

In further features, before the transmitting the pedestrian tour to the user device via the network, by the one or more processors: selecting one of the selected connecting ones of the arcs; identifying one or more replacement arcs for replacing the one of the selected connecting ones of the arcs; and replacing the one of the selected connecting ones of the arcs with the one or more replacement arcs in the pedestrian tour.

In further features, the identifying the one or more replacement arcs include identifying the one or more replacement arcs based on the scores of the one or more replacement arcs.

In further features, before the transmitting the pedestrian tour to the user device via the network, by the one or more processors: selecting a path segment between a first node and a second node, the path segment including one or more of the selected connecting ones of the arcs; and selectively replacing the path segment with a shortest path segment between the first node and the second node based on a comparison of (a) with (b), (a) being a first score of the shortest path segment divided by a first length of the shortest path segment; and (b) being a second score of the path segment divided by a second length of the path segment.

In further features, selectively replacing the path segment with the shortest path segment between the first node and the second node includes replacing the path segment with the shortest path segment between the first node and the second node when: the second length of the path segment is greater than twice the first length of the shortest path segment; the second score of the path segment is less than a first predetermined value* (a first sum of the scores the one or more of the selected connecting ones of the arcs of the path segment)* (a number of the one or more of the selected connecting ones of the arcs of the path segment); and (a) is greater than a second predetermined value multiplied by (b).

In further features: the preferences further include a target elevation gain; and the determining the scores includes, by the one or more processors, determining the scores for the arcs based on elevation gains of the arcs and the target elevation gain.

In further features: the preferences further include a maximum steepness; and the determining the scores includes, by the one or more processors, determining the scores for the arcs based on steepnesses of the arcs and the maximum steepness.

In further features the method further includes, after transmitting the pedestrian tour to the user device via the network: by the one or more processors, receiving a request from the user device via a network to adjust the target length of the pedestrian tour; in response to the receipt of the request, based on the adjusted target length: selecting at least one of the selected connecting ones of the arcs; identifying one or more replacement arcs for replacing the at least one of the selected connecting ones of the arcs; replacing the at least one of the selected connecting ones of the arcs with the one or more replacement arcs, thereby producing an updated pedestrian tour; and transmitting the updated pedestrian tour to the user device via the network for display on the user interface.

In further features, the receiving the request includes receiving the request after the user device has followed at least a portion of the pedestrian tour.

In further features, the request includes a request to one of increase and decrease the target length.

In further features, the selecting connecting ones of the arcs includes, selecting connecting ones of the arcs without user data regarding previously followed pedestrian tours.

In further features the method further includes: by the one or more processors, determining at least one alternative arc to replace one of the selected connecting ones of the arcs; and transmitting the at least one alternative arc to the user device for display with the pedestrian tour on the user interface.

In further features, determining the at least one alternative arc comprises determining the at least one alternative arc before a beginning of the pedestrian tour.

In further features, determining the at least one alternative arc comprises determining the at least one alternative arc in response to receipt of user input indicative of a request to adjust a target length of the pedestrian tour received during traversal of the pedestrian tour.

In further features the method further includes, by the user device, signaling with the absence or presence of one of a visual, audible, or haptic output in response to at least one of: the user device entering the at least one alternative arc; and the user device exiting the at least one alternative arc.

In further features the method further includes, by the one or more processors, providing navigation related sensory discernable feedback using a sensory discernable output device to direct a user of the user device along the pedestrian tour.

In a feature, a system for generating a pedestrian tour includes: one or more processors; and memory including code that, when executed by the one or more processors, performs functions including: receiving a query from a user device via a network, the query indicative of a request for a pedestrian tour and including (a) a location and (b) preferences including a target length for the pedestrian tour; obtaining a graph of a geographical area around the location of the user device, the graph including nodes indicative of path crossings and arcs indicative of paths connecting pairs of the nodes; determining scores for the arcs based on characteristics of the paths, respectively, and the preferences; selecting connecting ones of the arcs based on the scores of the connecting ones of the arcs, lengths of the selected connecting ones of the arcs, and the target length; adding the selected connecting ones of the arcs to the pedestrian tour to initialize the pedestrian tour; and transmitting the pedestrian tour to the user device via the network for display on a user interface.

In a feature, a system for generating a pedestrian tour includes: a means (e.g., a receiver) for receiving a query from a user device via a network, the query indicative of a request for a pedestrian tour and including (a) a location and (b) preferences including a target length for the pedestrian tour; a means (e.g., one or more processors and code) for: obtaining a graph of a geographical area around the location of the user device, the graph including nodes indicative of path crossings and arcs indicative of paths connecting pairs of the nodes; determining scores for the arcs based on characteristics of the paths, respectively, and the preferences; selecting connecting ones of the arcs based on the scores of the connecting ones of the arcs, lengths of the selected connecting ones of the arcs, and the target length; and adding the selected connecting ones of the arcs to the pedestrian tour to initialize the pedestrian tour; and a means (e.g., a transmitter) for transmitting the pedestrian tour to the user device via the network for display on a user interface.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein:

FIG. 1A is a functional block diagram of an example pedestrian tour system;

In the drawings, reference numbers may be reused to identify similar and/or identical elements.

DETAILED DESCRIPTION

System Architecture

Figure 1B:
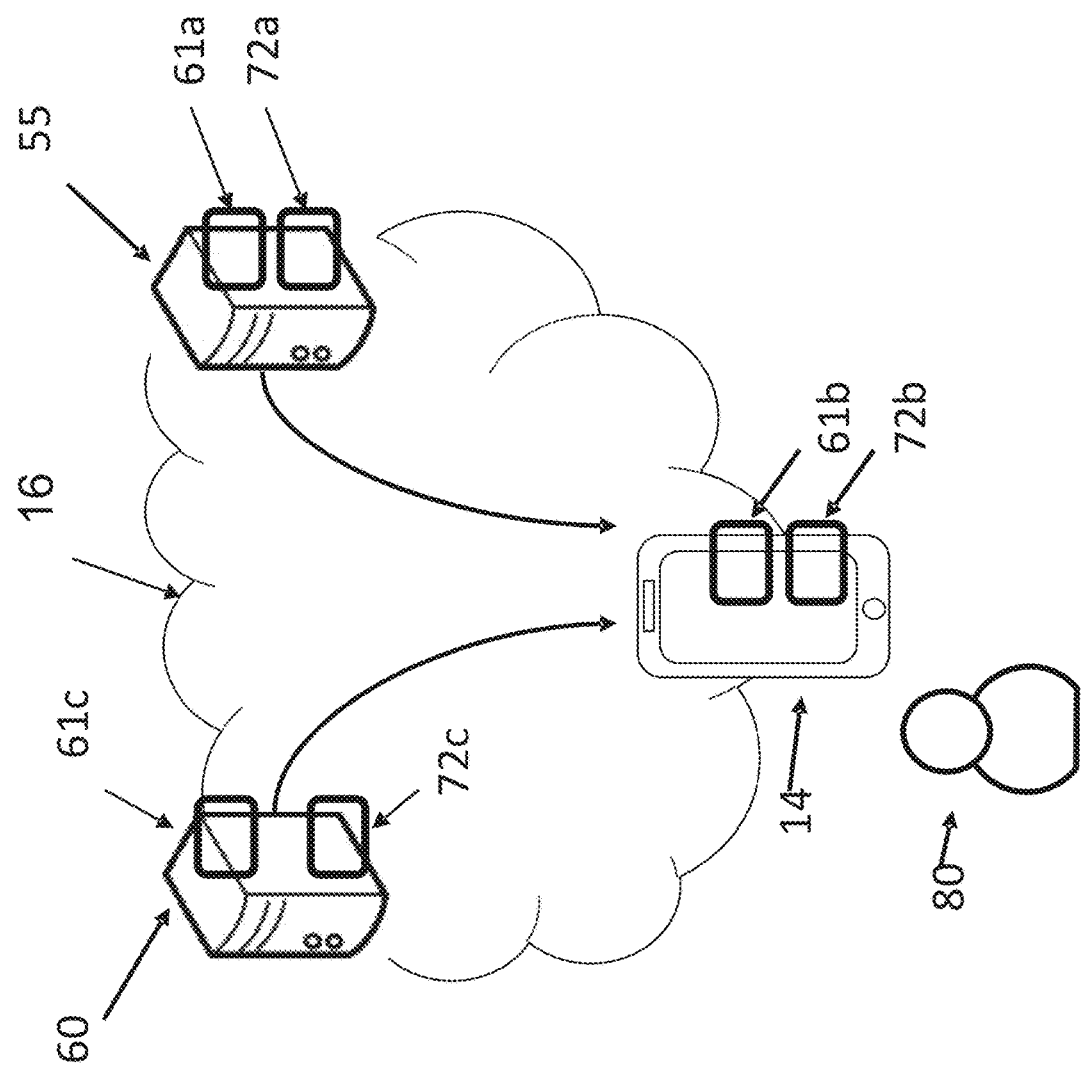
FIG. 1B is an example of system architecture in which a method of generating pedestrian tours is performed.

FIG. 1A includes a functional block diagram including a tour generation system 10 configured to respond to queries regarding routes for pedestrian tours. The tour generation system 10 is configured to receive queries for pedestrian tours from one or more user computing device(s) 14 via a network 16.

The tour generation system 10 determines routes for pedestrian tours based on the queries, respectively. The tour generation system 10 transmits responses regarding the routes for the pedestrian tours back to the user devices 14 that transmitted the queries, respectively.

The user devices 14 display the routes for the pedestrian tours on displays of the user devices 14, respectively. The user devices 14 may also output instructions (audibly and/or visibly) for following the routes while users traverse the routes with the user devices 14. For example, the user devices 14 may output instructions while users traverse the routes with the user devices 14 regarding when/where to turn, which direction to turn, etc. for example using the apparatus and methods set forth in U.S. patent application Ser. No. 16/592,943 entitled "System and Method for Communicating Possible Travel paths Through Head Scanning and Sound Modulation", the entire disclosure of which is incorporated herein by reference. The user devices 14 may also display other information to the users. For example, the user devices 14 may display additional information regarding points of interest (POIs) along the routes, respectively, and information relevant to the routes, respectively, etc. The tour generation system 10 and the user devices 14 communicate via the network 16.

A plurality of different types of user devices 14 are illustrated in FIG. 1A. An individual user computing device may also be referred to herein as a user device 14. The user devices 14 include any type of computing devices that is configured to generate and transmit queries for pedestrian tours to the tour generation system 10 via the network 16. Examples of the user devices 14 include, but are not limited to, smart (cellular) phones, personal media devices (e.g., iPods), tablet computers, and laptop computers, as illustrated in FIG. 1A. The user devices 14 may also include other computing devices having other form factors, such as mobile gaming devices, mobile televisions, consoles, navigation devices, wearable devices (e.g., smart watches, augmented reality glasses, virtual reality glasses), etc.

The user devices 14 may use a variety of different operating systems. In an example where a user device 14 is a mobile device, the user device 14 may run an operating system including, but not limited to, Android, iOS developed by Apple Inc., or Windows Phone developed by Microsoft Corporation. In an example where a user device 14 is a laptop or desktop device, the user device 14 may run an operating system including, but not limited to, Microsoft Windows, Mac OS, or Linux. The user devices 14 may also access the tour generation system 10 while running operating systems other than those operating systems described above, whether presently available or developed in the future.

In some examples, a user device 14 may communicate with the tour generation system 10 using an application installed on the user device 14. In general, a user device 14 may communicate with the tour generation system 10 using any application that can transmit queries to the tour generation system 10 to be responded to by the tour generation system 10. In some examples, a user device 14 may run an application that is dedicated to interfacing with the tour generation system 10, such as an application dedicated to pedestrian tour generation. In some examples, a user device 14 may communicate with the tour generation system 10 using a more general application, such as a web-browser application. The application executed by a user device 14 to communicate with the tour generation system 10 may display a search field on a graphical user interface (GUI) in which the user may enter questions. The user may enter a question using a touchscreen or physical keyboard, a speech-to-text program, or other form of user input.

A query entered into a GUI on a user device 14 may include words, numbers, letters, punctuation marks, and/or symbols. In general, a query may be a request for a route for a pedestrian tour from the tour generation system 10, where the starting point and the ending point of the pedestrian tour are the same. The starting point and the ending point of the pedestrian tour may be, for example, a present location (e.g., from a global positioning system of the user device 14) of the user device 14. The present location of the user device 14 may be included in the query along with other information, such as user preferences, tour length, elevation change, and other information.

A user device 14 may receive a response from the tour generation system 10 that is responsive to the query transmitted to the tour generation system 10. In various implementations, the user device 14 may receive and the tour generation system 10 may transmit more than one different possible route. In the example of the tour generation system 10 providing multiple routes, a user may select one of the route to follow via the user device 14.

The user device 14 may be running an application including a GUI that displays the route from the tour generation system 10. As described above, the application that presents the route for the pedestrian tour to the user may be dedicated to interfacing with the tour generation system 10 in some examples. In other examples, the application may be a more general application, such as a web-browser application.

In some examples, the tour generation system 10, or another computing system, may transmit additional information to the user device 14 such as, but not limited to, points of interest along the route of the pedestrian tour and/or other information associated with the route of the pedestrian tour. This additional information may be stored in a data store and transmitted by the tour generation system 10 to the user device 14 in some examples. In examples where the user device 14 receives the additional information, the GUI may display the additional information along with the route.

In some examples, user devices 14 may communicate with the tour generation system 10 via a partner computing system. The partner computing system may include a computing system of a third party that may leverage the functionality of the tour generation system 10. The partner computing system may belong to a company or organization other than that which operates the tour generation system 10. Example third parties which may leverage the functionality of the tour generation system 10 may include, but are not limited to, internet search providers and wireless communications service providers. The user devices 14 may send queries to the tour generation system 10 via the partner computing system. The user devices 14 may also receive responses from the tour generation system 10 via the partner computing system. The partner computing system may provide a user interface to the user devices 14 in some examples and/or modify the user experience provided on the user devices 14.

The tour generation system 10 may obtain mapping information for generating the route for pedestrian tours from a data source 20. The data sources 20 may include one or more mapping information providers.

The user devices 14, the tour generation system 10, and the data sources 20 may be in communication with one another via the network 16. The network 16 may include various types of networks, such as a wide area network (WAN) and/or the Internet. Although the network 16 may represent a long range network (e.g., Internet or WAN), in some implementations, the network 16 may include a shorter range network, such as a local area network (LAN). In one embodiment, the network 16 uses standard communications technologies and/or protocols. Thus, the network 16 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 16 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 16 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 16 can use custom and/or dedicated data communications technologies instead of, or in addition to, the ones described above.

The tour generation method presented hereunder may be implemented within a system architecture such as that illustrated in FIG. 1B, which includes two servers 55 and 60 and a user device 14 that communicate over the network 16. The two servers 55 and 60 may be part of the tour generation system 10. Each server 55 and 60 and the user device 14 include a data processor (61a, 61c, and 61b, respectively) and memory (72a, 72c, and 72b, respectively), such as a hard disk.

The server 55 may be a map server, which can be for example an external service accessible by an application programming interface (API), such as Open Street Map.

The server 60 may be an elevation data server, which can be for example an external service accessible by an API, such as BD ALTI® from IGN (the French National Institute of Geographic and Forestry Information).

The user device 14 is used to present on its user interface (e.g., display and/or speaker) the closed pedestrian tour to a user 80. Closed pedestrian tours may refer to pedestrian tours that start and end at the same location.

In one embodiment, the tour generation method presented herein operates on server 55, server 60, and/or user device 14. Alternatively, the tour generation method may operate on an independent server that communicates with server 55, server 60, and/or user device 14.

In another embodiment, the servers 55 and 60 may be merged. In yet another embodiment, the functionality of one or both of the two servers 55 and 60 may be merged into a standalone user device 14.

Map Representation and Terminology

A map is represented by the tour generation method as a graph (e.g., a directed graph) where pedestrian path (road, trail, walkway, path, etc.) crossings (i.e., intersections) are represented as nodes. Every path between two crossings is represented by an edge or by an arc that has an associated direction (a directed edge). Directed edges are edges that have an associated direction between two nodes. An edge may be replaced by two directed arcs, one for each direction; also, two arcs may be replaced by an edge, as long as knowledge of each arc's direction is not required.

Paths can be considered to be bidirectional. An edge can therefore be substituted by two arcs of opposed directions to take into account the direction of the pedestrian on the path.

A path segment is a list of successive edges or arcs. A path segment may include one or more edges or arcs. A route is an ordered list of edges or arcs (not necessarily adjacent) that starts at an origin node and ends at an end node. A linking path is a path segment that links two arcs of a route. A tour associated with a given route is a (e.g., closed) path comprising arcs taken from the route and linking paths there between.

Using the representation of the map as a graph (e.g., a directed graph), the tour generation method generates pleasant closed pedestrian tours through solving two NP-hard combinatorial problems: (1) a first (knapsack) problem where the goal is to select on a map the path segments that bring the highest value to the user (according to user preferences) within a budget constraint; and (2) a second (traveling salesman) problem where the goal is to find the shortest route that visits those path segments.

Tour Generation

Score Function for a Given Path

The tour generation method receives the following information: a position, from which the pedestrian tour is to start and to which it is to end; and the region in which the pedestrian tour is to be situated in the form of a map of the region. In various implementations, the position may be the position of the user device 14 from which the request for the tour was received.

For a given path segment selected by the tour generation method, the tour generation method includes determining path segment scores using standard OSM data and assigning the scores to path segments, respectively. The path segment scores assigned to path segments may for example be determined by the data processor 61a, 61b of the server 55 and/or the user device 14. The path segment scores assigned to path segments express the value that the path segments would bring to the tour, respectively. The score of a path segment may increase as the value of that path segment to the tour increases and vice versa. For a given path segment, the tour generation method includes determining the path segment scores through rewards and penalty terms.

For example, a scoring weight, weight(e), may be determined for each directed edge e (i.e., arc e) of a given path segment, through summing the rewards and penalties determined for that directed edge. As an example, the tour generation method determination for a given directed edge e can be as follows:

1. Use the OSM type of path.
   The tour generation method associates each directed edge in the OSM data with a type of path information, such as one of the following categories: "pedestrian", "foot_track" or "residential".
   The tour generation method assigns a reward to directed edges extracted from the OSM data corresponding to the user's preferred type of path. The tour generation method assigns no reward (and no penalty) when directed edges belong to an undesirable (non user-preferred) type of path. For example, the tour generation method may assign a higher score to a pedestrian road than a main (vehicular) road.

2. Use parks and land use information.
   The tour generation method assigns a reward to directed edges extracted from the OSM data located in or near parks, open spaces, past scenic vistas, and other geographic formations (e.g., rivers, mountains, etc.). For example, the tour generation method may assign a reward to directed edges along a river and to directed edges belonging to a hiking trail.

3. Use main road information.
   The tour generation method assigns a penalty to directed edges extracted from the OSM data corresponding to vehicular roads. The tour generation method may also assign a penalty to directed edges next to vehicular roads. Penalties may be assigned to directed edges next to vehicular roads due to possible vehicular congestion, noise, and/or pollution, which would decrease a value of that directed edge to the overall pedestrian tour.

4. Use touristic points of interest.
   The tour generation method assigns a reward to directed edges extracted from the OSM data located along or near touristic points of interest. Examples of touristic points of interest include artistic works (in the OSM data: "Tourism=artwork"), religious edifices (in the OSM data: "amenity=place of_worship"), and architectural attractions (in the OSM data: "historic=*"), and gathering places (e.g., squares) in towns.

For each pair of successive directed edges, the tour generation method also calculates and adds an additional penalty term to the path segment score. The additional penalty term may be denoted turn $(e_i e_{i+1})$ and may be calculated as a function of a true angle between the two paths on the map corresponding to the two successive directed edges to penalize tours with sharp turns. The additional penalty term may therefore help prevent the pedestrian tour from having complex geometries. For example, two paths having an angle of intersection of greater than a predetermined angle (e.g., 90 degrees) may be penalized. Two paths having an angle of intersection that is less than the predetermined angle may not be penalized.

Further, the tour generation method may calculate two penalty terms for the path segment. These two penalty terms may be denoted $ev_{penalty(e)}$ for directed edges and $nv_{penalty(n)}$ for nodes. The tour generation method may determine the two penalty terms as a function of the number of times a given directed edge or a given node would be traversed by a pedestrian walking the pedestrian tour. These two penalty terms thus help prevent the pedestrian tour from traversing the same path segment and/or node more than one time during the pedestrian tour.

The tour generation method may determine the path segment score of a given path segment p (e.g., a route) composed of directed edges $e_i$ using the equation:

$$\text{score}(p) = \sum_{e \in p} \text{weight}(e) + \mu \times \sum_{i=1}^{|p|-1} \text{turn}(e_i e_{i+1}) + \gamma \times \sum_{e \in p} ev_{penalty(e)} + \gamma \times \sum_{n \in p} nv_{penalty(n)}$$

where score is the score of the path segment p, μ and γ are multiplicative factors adapted to user preferences for the pedestrian tour. In various implementations, other rewards and penalties can further be contemplated in place of or in addition to those above presented. For example, the tour generation method may determine and add a reward or a penalty based on the shape of a route (or loop) and/or the geometric simplicity of the tour relative to the user preferences. Additionally or alternatively, the tour generation method may determine and add a reward based on a route having sequences comprising a plurality of successive good directed edges. In this example, good directed edges may include directed edges with weights greater than a predetermined value (a threshold).

First Method (Greedy Approach)

Using the calculation of path segment score above described by way of example, a first loop path can be generated as follows.

Figure 2:
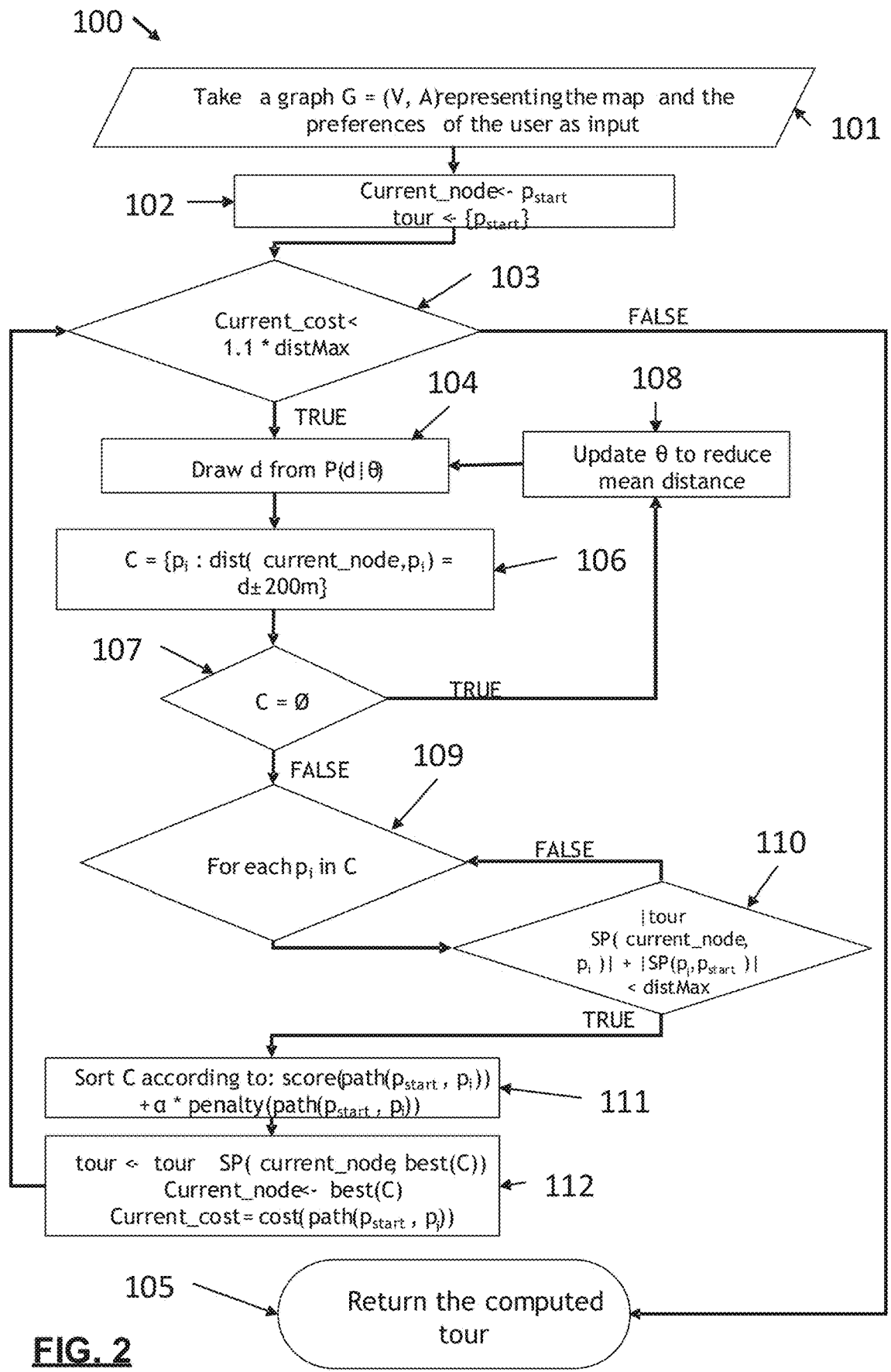
FIG. 2 is a flowchart depicting an example method of generating a pedestrian tour.

FIG. 2 includes a flowchart depicting a (first) example method of generating closed pedestrian tours. The algorithm illustrated by FIG. 2 is a method that generates a pleasant closed pedestrian tour. The method may be performed by one or more processors, such as one or more of the processors 61a-61c. The method iteratively adds new directed edges to the tour starting from a target starting location until a target distance (defined by the user preferences) is reached.

At 101, the data processor 61b of the user device 14 communicates with the server 55 to obtain the OSM map data for a given map of an area around the target starting location where the pedestrian tour will both start and end. The data processor 61b also retrieves a set of variables representing the preferences of the user as input (i.e., user preferences).

The user preferences include, for example, the target distance (distMax) of the closed tour and other parameters, such as a desired path type (e.g., pedestrian or residential) which indicates a preferred type of paths of the user, desired points of interest or locations (e.g., vistas) to see along the closed tour, desired proximity to parks and vistas. The user preferences may also include a target elevation profile of the closed pedestrian tour. The target elevation profile may include, for example, a gradient (or steepness) and/or an overall elevation gain for the closed pedestrian tour.

The user preferences can be obtained in real time through a user interface of the user device 14 with which the user 80 interacts to input the user preferences. Additionally or alternatively, the user preferences can be retrieved by the data processor 61b from the memory 72b of the user device 14.

At 102, the current node for the closed tour is initialized to the value corresponding to the target starting location ($p_{start}$), the tour is initialized to a singleton $\{p_{start}\}$, and the length of the tour current_cost is initialized to 0.

At 103, it is determined whether the length of the tour (current_cost) is less than the target length. A predetermined value may also be applied to the target length to allow for the length of the tour to be less than or greater than target length by a predetermined amount. In various implementations, the predetermined value may be 1.1 to allow the length of the tour to be +/−10% of the target length. If 103 is false, the tour is complete, and control transfers to 105. If 103 is true, the following steps are repeated:

At 104, a distance d (e.g., a random distance) is drawn from a probability distribution P(d|θ) having a set of parameters θ.

At 106, a set of crossings C containing every node approximately within a distance d (for example d±200 m) from the current node is created.

At 107, it is determined whether the set of crossings C is empty. If 107 is true, at 108 the method includes changing the parameters θ of the distribution and returning 104 to draw a new distance d. If 107 is false, the method continues with 109.

At 109, the method includes iterating over each crossing (noted $p_i$) of the set C and performing the following test:

At 110 verify that if the shortest path segment from the last node of the path segment to the crossing $p_i$ is added to the current tour, the sum of the total length of the tour and the length of the shortest path segment from $p_i$ to $p_{start}$ is smaller or equal to the target length of the tour distMax. If not, remove $p_i$ from the set of crossings C.

At 111, the method includes sorting the set of crossings C according to the score of the associated path segment from $p_{start}$ to each $p_i$ of the set C.

At 112, the method includes selecting the best crossing of the set C or a crossing chosen (e.g., randomly) from the k best road crossings of the set C according to the previous sorting and added to the route, the shortest path segment from the current node to the selected node is added to the current tour, the length of this path segment is added to the length of the tour current_cost, and the current node is updated to this selected node. Control then returns to 103 to repeat.

At 105, the method includes outputting the completed closed pedestrian tour. For example, the completed tour can be displayed on a user interface of the user device 14. If the closed tour is generated remotely, the closed tour is also communicated to the user device 14.

Figure 3:
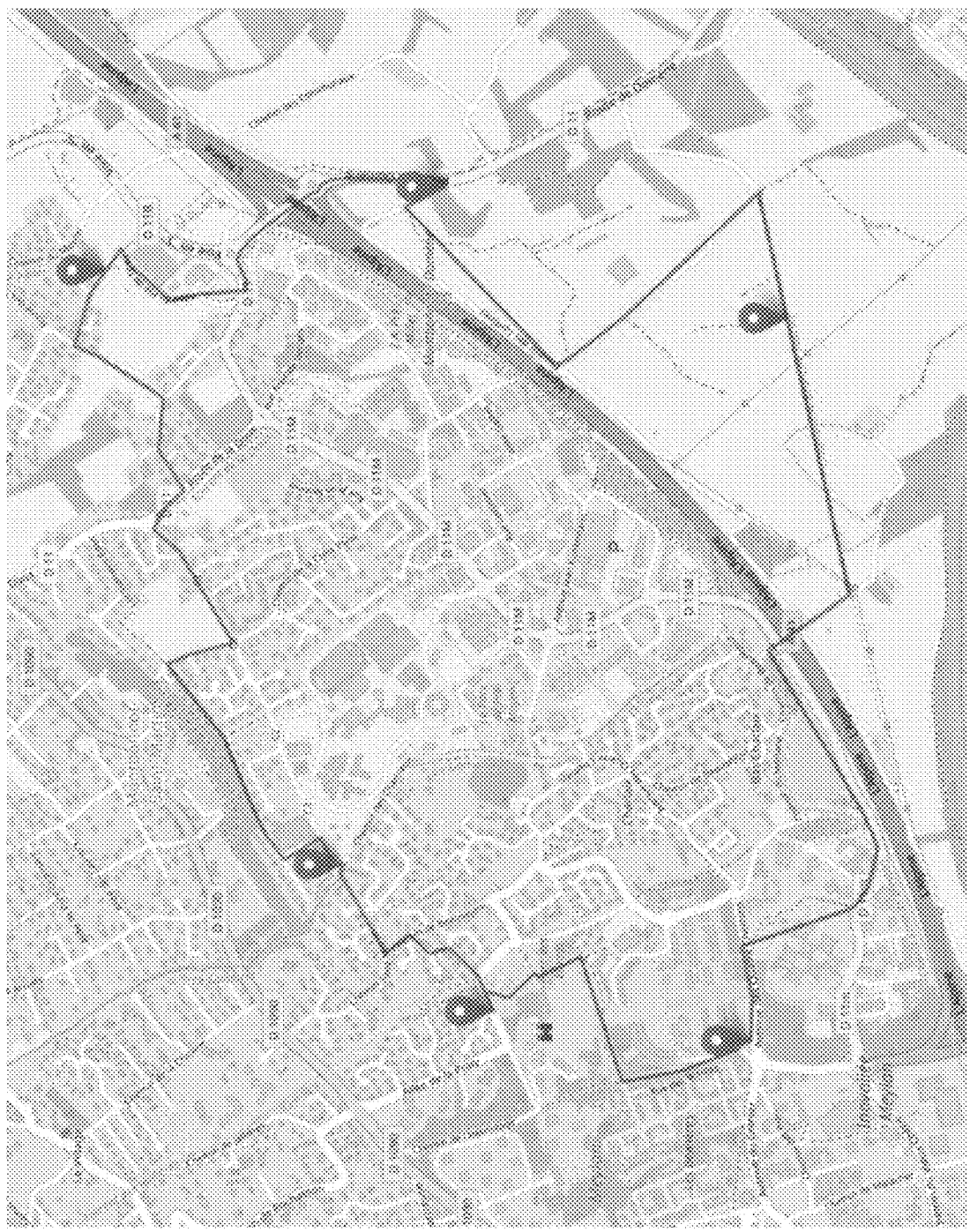
FIG. 3 is an example of a 10 km closed pedestrian tour generated based on the example of FIG. 2.

FIG. 3 includes an example map of an example of a 10 kilometer (km) closed tour generated by the method of FIG. 2. Such a map may be displayed on the display of the user device 14. A current location of the user device 14 may also concurrently be displayed on the user device 14. The user device 14 may also provide directions to follow the tour as the user device 14 traverses the tour. The method 100 of FIG. 2 can be described using the following pseudocode.

```
GreedySP (100):

Take a graph G = (V, A) representing the map and the preferences
of the user as input                                             (101)
current_node <- starting_point                                   (102)
while current_cost < 1.1*distMax:                                (103)
1) Draw d from P(d|θ) (for instance from a gamma distribution)   (104)
2) Compute Weighted Shortest Path Segments for the set of
   nodes p such that distance(current_node, p) = d ± 200 m       (106)
3) If the set of nodes is empty, update θ to reduce the mean     (107,
   distance and redraw a distance d                              108)
4) For each of the nodes p:                                      (109)
     i) Compute the score of shortest path segment:
        score(path(p))
    ii) Check that if we go to p, then we can still go back to
        the starting point without exceeding the total distanceMax (110)
   iii) Compute some penalty or distance between the path
        segment going to p and the path segment already done,
        based on distance and or angles
                                                                 (111)
5) Criteria(p) <- score(path(p)) + α penalty(path(p))
6) Sort, possibly randomize the top of the list and pick one node p'
7) current_node <-p'
8) current_cost + = cost(path(p))                                (112)
Compute the final score(path(p)),                                (112)
post-process the resulting path segments to remove useless
directed edges and to optimize further.                          (105)
```

Second Method (Dynamic Arc Orienteering)

Figure 4:
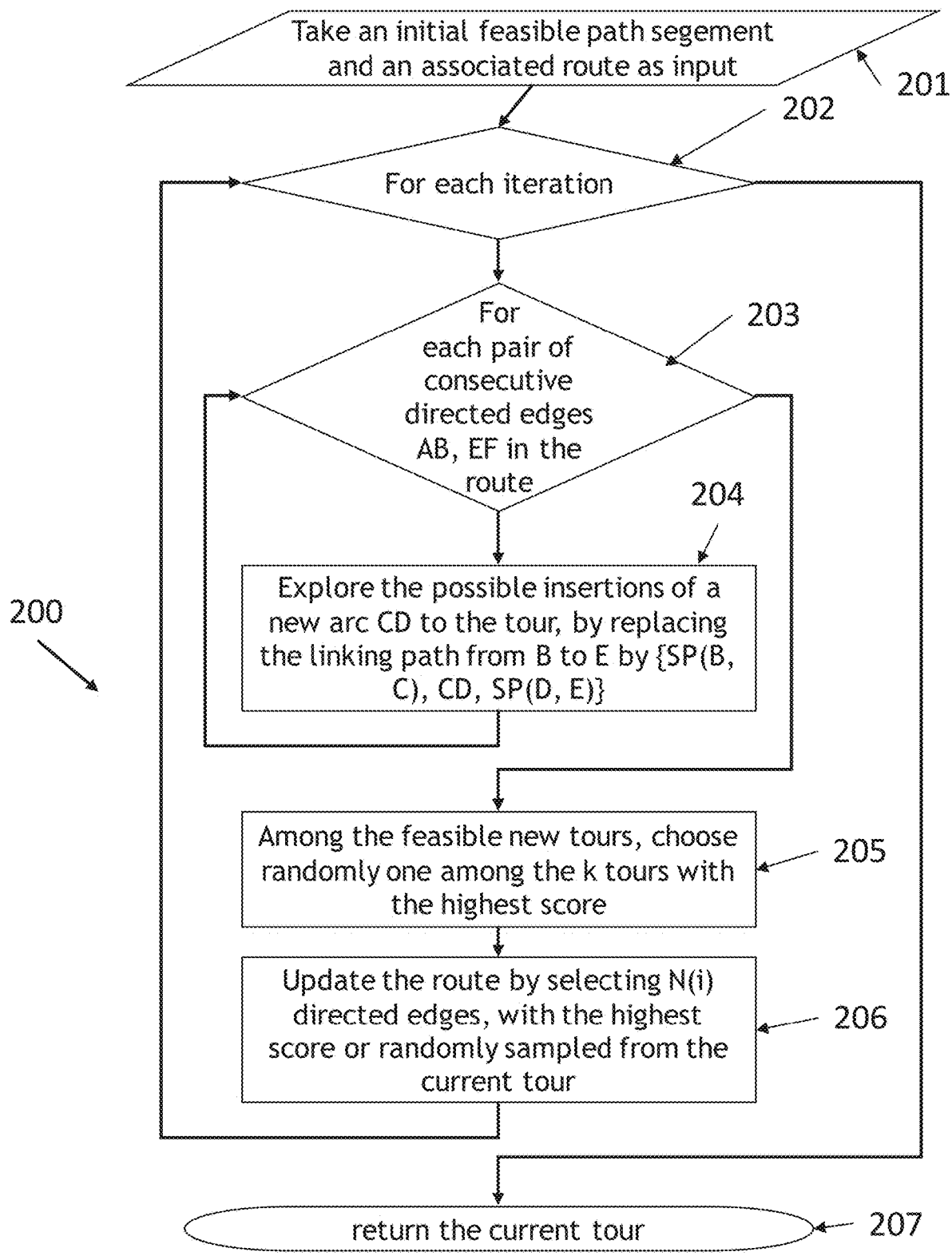
FIG. 4 is a flowchart depicting an example method of generating a pedestrian tour.

In the following, SP(A,B) denotes the shortest path segment in the graph from a node A to a node B. FIG. 4 includes a flowchart depicting an example (second) method of generating closed pedestrian tours. The method may be performed by one or more processors, such as one or more of the processors 61a-61c.

The method 200 begins with 201 where an initial closed tour is obtained, for example, according with the example of FIG. 2 discussed above.

One or more processors performs the following steps, which are repeated for a given number of iterations (with the current iteration denoted as i) depending on the processing time available 202 to optimize the tour:

At 203, iterate over each pair of consecutive arcs (directed edges) AB, EF in the tour:
  At 204 create a list of feasible new tours by enumerating all the possible insertion of a new arc (a directed edge) CD to the tour in order to replace the linking path from B to E by {SP(B,C), CD, SP(D,E)} (step 204);
At 205, among the listed feasible new tours, choose the best or choose one (e.g., randomly) among the best k tours, according to their scores;
At 206, define the new route (with a score that promotes user preferences) by selecting a subset of a given number N(i), depending on the current iteration, of arcs (directed edges) from the tour that will be fixed for the next iteration of the algorithm.
The method includes outputting the completed closed pedestrian tour at 207. For example, the completed tour can be displayed on a user interface of the user device 14. If the closed tour is generated remotely, the closed tour is also communicated to the user device 14.

Figure 5:
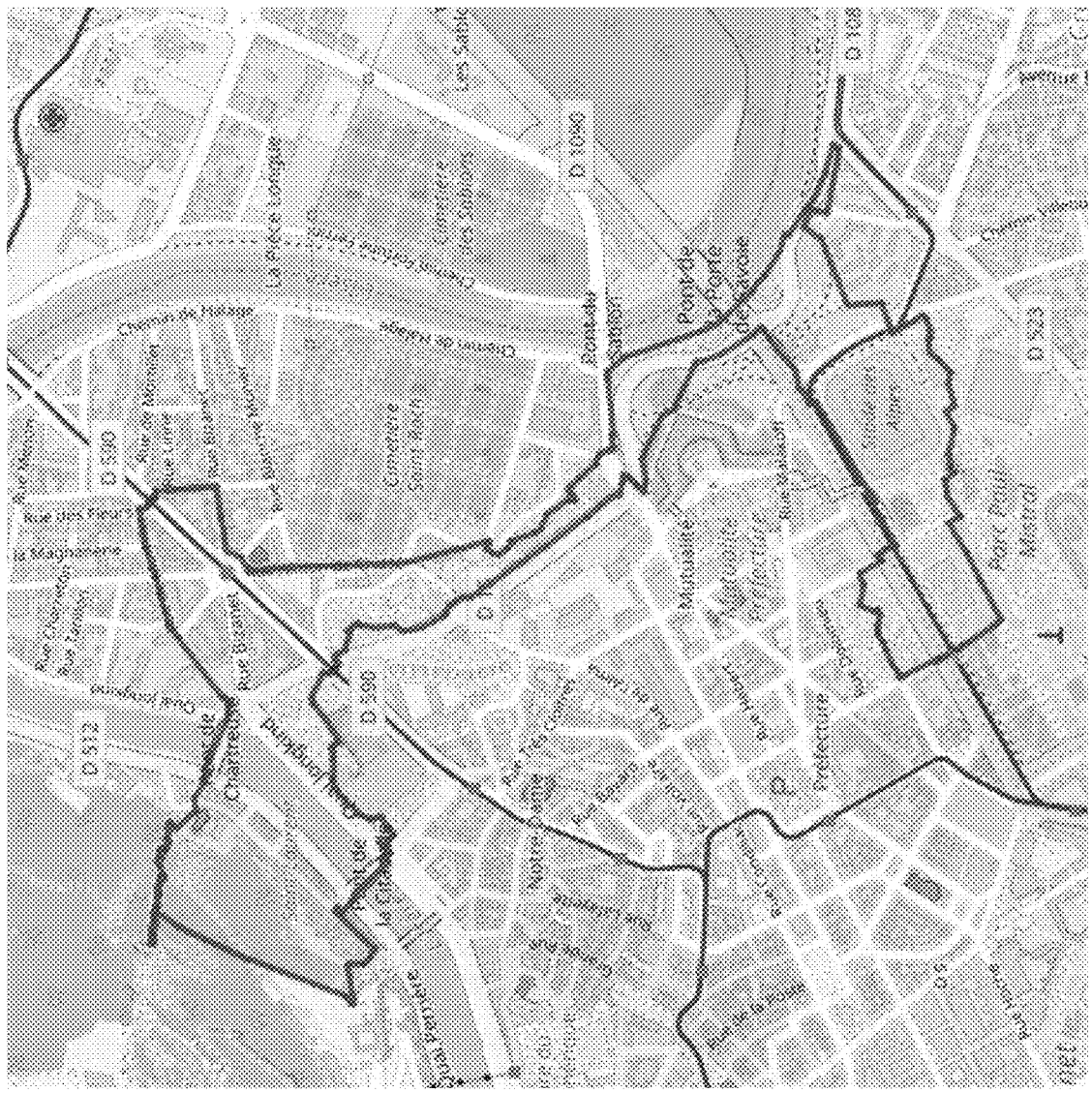
FIG. 5 is an example of a 7 km closed pedestrian tour generated based on the example of FIG. 4.

FIG. 5 includes an example map of an example of a 7 km closed tour generated by the method of FIG. 4. Such a map may be displayed on the display of the user device 14. A current location of the user device 14 may also concurrently be displayed on the user device 14. The user device 14 may also provide directions to follow the tour as the user device 14 traverses the tour. The method 200 of FIG. 4 can be described using the following pseudocode.

```
Dynamic Arc Orienteering (200):

Take an initial feasible path segment as input                   (201)
For each iteration i:                                            (202)
  - For each pair of consecutive (but not necessarily adjacent)
    arcs AB, EF in the route:                                    (203)
    • explore the possible insertions of a new arc CD to the
      route, by replacing the linking path from B to E with the
      path segment defined by the sequence SP(B, C),
      CD, SP(D, E).                                              (204)
  - Among the feasible new tours (i.e. tours where no node is
    visited more than once and total distance less than Dmax),
    choose randomly one among the k tours with the highest
    score.                                                       (205)
  - Update the route by selecting N(i) arcs, with the highest
    score or randomly sampled from the current tour.             (206)
  - Stop and return the current tour when the maximal number
    of iterations is reached or no more insertions are possible. (207)
```

Different strategies can be used to define the function N(i) that represents the number of arcs or edges of the tour that are fixed at iteration I and/or how to select the arcs. If the tour included some arcs that were really good but part of shortest path segments, these can be discarded by future insertions. The method may fix the route arcs dynamically to make sure the extensions are done while keeping the best visited arcs. However, choosing the best arcs may lead to a local minimum. To avoid this from occurring, the method may choose arcs randomly at each iteration to improve resulting tours.

Post-Processing

Figure 6:
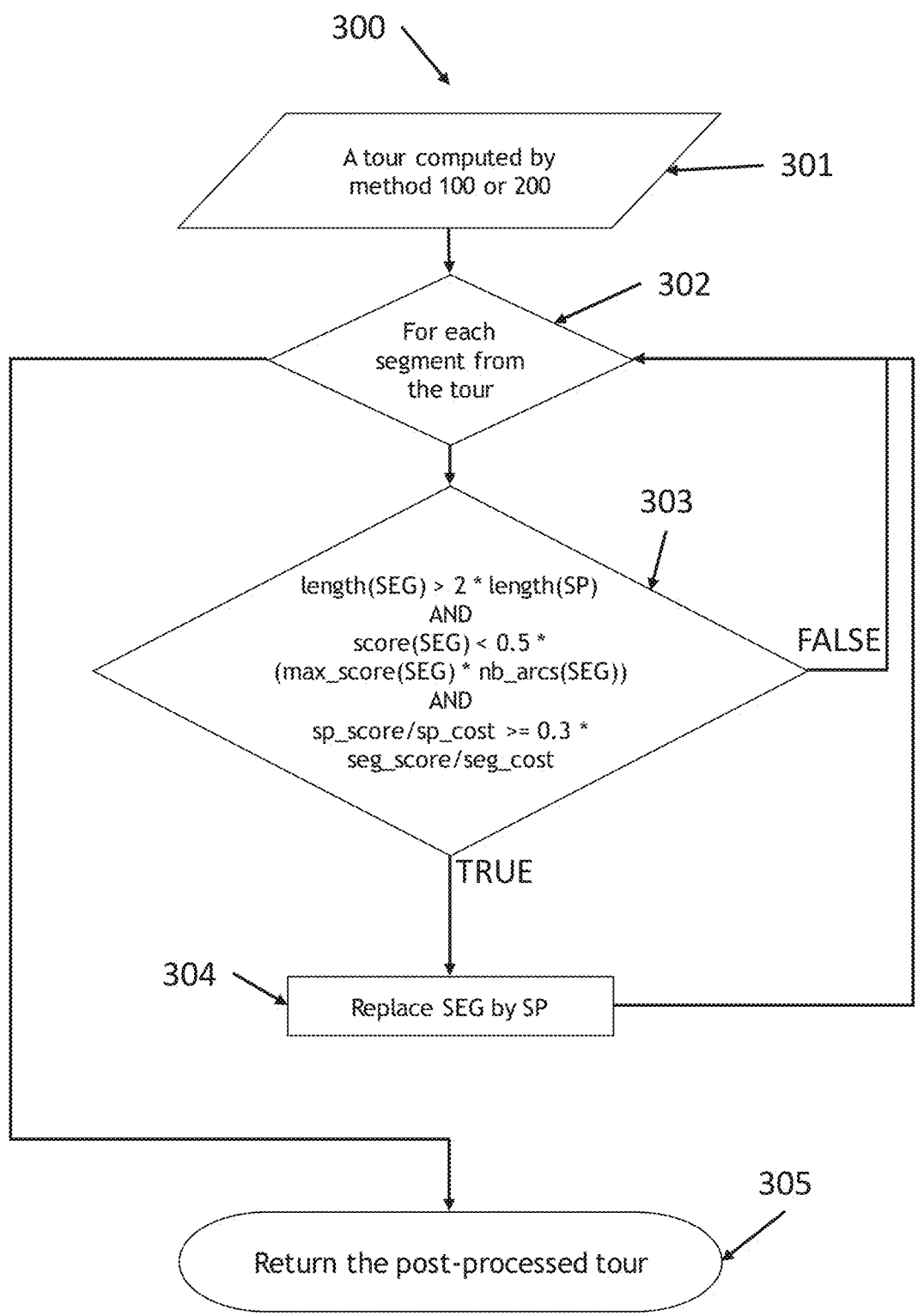
FIG. 6 is a flowchart depicting an example method of post-processing.

FIG. 6 includes a flowchart depicting an example method 300 of post processing that can be performed on a completed tour, such as a tour resulting from the example of FIG. 2 or the example of FIG. 4. The method 300 may be performed by one or more processors, such as one or more of the processors 61a-61c.

At 301, the method receives the closed tour generated as described above as input data. To improve the shape of the tour, the following steps are performed on the tour:

At 302, the method iterates over each path segment from a node A to a node B of the tour, applying the following procedure:
  At 303, compare the path segments from A to B on the tour and the shortest path segment from A to B. If the path segment is much longer than the shortest path segment, consider the path segment a detour, and consider the path segment to be interesting only if it brings a good score. In that case the ratio score/length of the path segment is compared to the shortest path segment as well as its maximal score as shown in FIG. 6;
  if, according to the previous comparisons the path segment is viewed as a detour, at 304 replace the path segment from A to B by the shortest path segment between A and B. For example, 304 may replace the path segment from A to B with the shortest path segment between A and B when the length of the path segment is greater than twice the length of the shortest path segment, the score of the path segment is less than a predetermined value (e.g., 0.5)* the (cumulative) score of all of the arcs of the path segment* the number of arcs of the path segment) and the score of the shortest path segment divided by the length (cost) of the shortest path segment is greater than a second predetermined value (e.g., 0.3) * the (cumulative) score of the path segment divided by the length (cost) of the path segment;

Once each path segment has been assessed, the tour is complete, and the completed tour obtained at the end of this procedure is then output to the user at 305. For example, the completed tour can be displayed on a user interface of the user device 14. If the closed tour is generated remotely, the closed tour is also communicated to the user device 14.

303 and 304 can be formulated as the following logical test:

---
If (length(SEG) > 2 * length(SP)) and
   (score(SEG) < 0.5 * (max_score(SEG) * nb_arcs(SEG))) and
   (sp_score/sp_cost >= 0.3 * seg_score/seg_cost)
then replace the SEG by SP
---

The post-processing may remove some artifacts and artificial detours, such as detours solely to achieve the target distance. This saves costs (distance) that can be reinvested in another part of the tour to increase an overall value of the tour. One option is to greedily expand the tour (e.g., segments) where the tour has good scores. For example, by applying the greedy approach described above, one option is to re-run the dynamic arc orienteering approach on the shortened route to expand the route and to maximize the score.

In various implementations, the one or more processors may generate multiple solutions (tours) in parallel. One or more than one of the multiple tours can be presented to the user via the user device 14. However, alternative post processing can be performed to promote diversity in the set of path segments proposed, such as by using Maximum Marginal Relevance techniques. In various implementations, the one or more processors may select, among the closed tours with the highest scores, those with the best geometry or shape. For example, the one or more processors may select the closed tours that form the largest polygons by comparing the surfaces delimited by the closed tours or may select the simplest polygons by comparing the number of intersections.

Elevation

The one or more processors may generate the tours taking further based on elevation data, such as to achieve elevation targets included in the user preferences. In this regard, the one or more processors may obtain elevation data for all arcs in the graph. The one or more processors may obtain the elevation data from the OSM and/or another suitable database, such as an elevation database.

To obtain missing elevation data, such as the elevation of all crossings or nodes of the routing graph, a topological database may be used. For example, elevation data may be obtained from the server 60 using an application programming interface (API). The server 60 may include a topological database that provides elevation data according to a digital elevation model (DEM), for example complying with a DEM standard, composed of squares of a predetermined area (e.g., 25 meters by 25 meters).

When generating tours, this level of precision may be too low. Using for each node the mean elevation of the square in which it is located may cause tours to be generated with arcs linking the various nodes of short length (e.g., a few meters). Selected path segments may be either located within one of the squares and thus wrongly estimated as totally flat or located on the border of two squares and wrongly estimated as too steep if the two squares have different mean elevation values.

The one or more processors (e.g., the processor 61b of the user device 14) estimates the elevation of each of the nodes, such as using inverse distance weighting from the four closest square's elevation data. Each square of the grid may be represented in its center location. The one or more processors determine the elevation of each node as a weighted sum of the elevations of the four closest surrounding center locations. In this sum, the closer the node is to the center location, the higher the impact or weight it has in the computation of the sum.

The sum's weights are proportional to the inverse of the distance between the nodes and the center locations:

$$\hat{Z}(\vec{S}) = \frac{\sum_{i=1}^{n} \frac{Z(\vec{S_i})}{\|\vec{S_i} - \vec{S}\|^p}}{\sum_{i=1}^{n} \frac{1}{\|\vec{S_i} - \vec{S}\|^p}},$$

where S is the location where the elevation must be determined, $S_i$ the location with a known elevation, $\hat{Z}(x)$ is the elevation at location x, $\| \|^p$ represents the p-norm, and n is the number of closest surrounding center locations considered. In particular, this method gives reasonable results with p=1 and n=4.

Elevation Profile Preferences

Elevation includes two aspects: elevation gain and steepness (or gradient). Both elevation gain and steepness have an effect on the difficulty of a tour. Elevation gain is the total cumulative elevation gain of the entire tour, i.e. the sum of the elevation gains of the successive segments. Elevation gain of the tour may be a measure of the difficulty of a tour. Steepness may be expressed relative to steepest parts of the tour.

In walking (or hiking), Naismith's rule may define the impact of elevation in walking (uphill) called. The additional effort brought by elevation gain could be converted into adding or subtracting distance to/from the route. In terms of time and effort, 100 meters (m) of height difference (D+) may be equivalent to running horizontally 1 km. For example, running 10 km with 300 m of D+ may be equivalent to running 13 km horizontally.

Elevation gain also has an impact on speed. For example, every percent of gradient of incline (going uphill) may slow a pedestrian down by 7-9 seconds per kilometer. Every percent gradient of decline (going downhill) may speed a pedestrian up by 5 seconds per kilometer.

The user preferences may include one of a set of elevation profiles, such as one of three successive classes or difficulty levels: flat, hilly and alpine. Each of elevation profiles corresponds to a different allowable ranges of cumulated elevation gain and steepness for tours. For example, the elevation profiles can be: (1) a first (e.g., flat) profile where, for example, the cumulative elevation gain is less than 1% of the distance (e.g., <100 m for 10 km) and the maximum steepness is 5%; (2) a second (e.g., hilly) profile where, for example, the cumulative elevation gain is between 1% and 3% of the distance (e.g. 100-300 m for 10 km) and the maximum steepness is 10%; and (3) a third (e.g., alpine) profile where, for example, the cumulative elevation gain is greater than 3% of the distance (e.g., >300 m for 10 km) and the maximum steepness is 15%. The cumulative elevation gain and the maximum steepness of the second profile is greater than the cumulative elevation gain and the maximum steepness of the first profile. The cumulative elevation gain and the maximum steepness of the third profile is greater than the cumulative elevation gain and the maximum steepness of the second profile.

While the example of 3 elevation profiles is provided, the number of possible elevation profiles may be 3, greater than 3, or less than 3. The elevation profiles can be predetermined, or one or more characteristics of the elevation profiles (e.g., cumulative elevation gain and/or maximum steepness) may be adjusted based on user input to the user device 14.

In various implementations, the elevation data may also include a target interval (period). The target interval over which to experience the elevation gain may be user input or predetermined target intervals may be associated with the elevation profiles.

For steepness, an overall target steepness to match may not be defined. Instead, it may be beneficial to include steepness values to avoid. The one or more processors may not produce tours that always have the same acceptable steepness. Instead, the one or more processors may be configured to produce tours that include flat and steeper segments that may or may not have steepness that are limited to the maximum steepness associated with the profile. While the elevation gain objective applies to the whole tour (as it is constituted by the sum of the elevation gains of each segment), the steepness constraint may be applied to most segments of the tour, but not necessarily to all segments of the tour. For example, some users may prefer and accept a tour including a very short steep segment in a tour if that segment enables the pedestrian to reach a very pleasant area or path within the tour.

The tour generation method may not exclude segments having a steepness that is greater than the maximum steepness associated with the elevation profile. Instead, the tour generation method may simply penalize too steep segments. In another example, the tour generation method may restrict the cumulated length of subsequent segments that are above the maximum steepness to avoid including too many difficult segments in the tour.

The elevation gain already provides a natural limit for steepness in the sense that, with a flat profile for a given total distance, the total elevation gain is already limited. Thus, the resulting tour may either only include in a small proportion or cumulated distance with high steepness or a higher proportion or cumulated distance with lower steepness.

Tour Generation Based on Elevation Profile

The one or more processors may generate tours to match the selected elevation profile and the user preferences, for example, by implementing elevation gain and/or maximum steepness constraints.

For example, to enforce the steepness constraint, the one or more processors may determine a penalty and add the penalty to the path segment scores of the path segments that have steepnesses that are greater than the predetermined maximum steepness associated with the elevation profile of the user preferences. The one or more processors may not add the penalty to path segment scores of path segments that have steepnesses that are less than the predetermined maximum steepness.

To achieve the target elevation gain, the one or more processors may perform one or both of the (1) and (2) as follows:

(1)(A) Apply a hierarchical optimization that considers elevation gain as the first objective and the pleasantness score (described above) as a second objective until the current solution achieves the target elevation gain. (B) When the elevation gain is in the target range, maximize the pleasantness keeping the elevation range as a constraint.

(2) Find an intermediate point. Choose an intermediate point located at an appropriate elevation (e.g., +/− a predetermined amount of an average elevation of the entire graph). Start the tour generation from this intermediate point, including the path segment from the starting point to the intermediate point.

The penalty added for steep path segments is used to limit the maximum steepness. The penalty, however, may be set such that segments with steepnesses greater than the maximum steepness will always be excluded from tours. To avoid taking a steep direct path to reach a given destination, a user may accept making detours covering more distance but avoiding the steep segments. The weighted shortest path segments that include the added penalty will represent implement this preference.

The tour generation method therefore penalizes steep path segments. The penalty may begin to be added when the steepness of a path segment is equal to the maximum steepness of the elevation profile and may increase as steepness increases above the maximum steepness.

Figure 7:
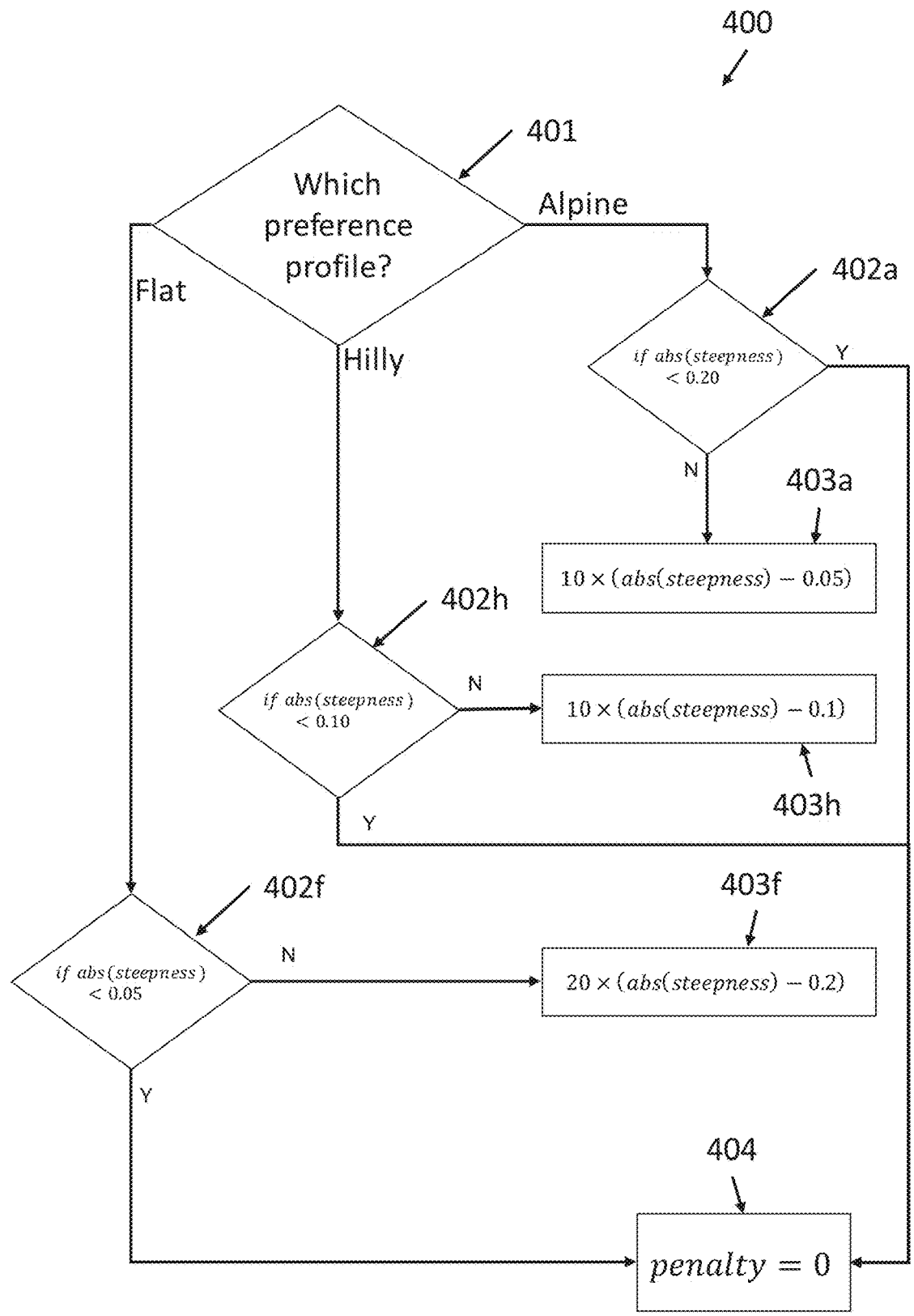
FIG. 7 is a flowchart depicting an example method of determining a penalty based on steepness of an arc.

FIG. 7 includes a flowchart depicting an example method 400 of penalty calculation.

At 401, the one or more processors retrieve the user preferences and, more particularly the elevation profile. The one or more processors determine whether the elevation profile is the first (flat) profile, the second (hilly) profile, or the third (alpine) profile. If the elevation profile is set to the first (flat) profile, the method continues with 402*f*. If the elevation profile is set to the second (hilly) profile, the method continues with 402*h*. If the elevation profile is set to the third (alpine) profile, the method continues with 402*a*.

When the elevation profile is set to the first profile, at 402*f*, the one or more processors determine whether the steepness (e.g., the absolute value abs of the steepness) of a path segment is less than a predetermined maximum steepness associated with the first profile (e.g., 5%). If 402*f* is false, the one or more processors may set the penalty for the path segment based on or equal to 20×(abs(steepness)−0.05) at 403*f*. If 402*f* is true, the one or more processors may set the penalty for the path segment based on or equal to 0 at 404.

When the elevation profile is set to the second (hilly) profile, at 402*h*, the one or more processors determine whether the steepness (e.g., the absolute value abs of the steepness) of a path segment is less than a predetermined maximum steepness associated with the second profile (e.g., 10%). If 402*h* is false, the one or more processors may set the penalty for the path segment based on or equal to 10×(abs(steepness)−0.10) at 403*h*. If 402*h* is true, the one or more processors may set the penalty for the path segment based on or equal to 0 at 404.

When the elevation profile is set to the third (alpine) profile, at 402*a*, the one or more processors determine whether the steepness (e.g., the absolute value abs of the steepness) of a path segment is less than a predetermined maximum steepness associated with the third profile (e.g., 20%). If 402*a* is false, the one or more processors may set the penalty for the path segment based on or equal to 20×(abs(steepness)−0.05) at 403*a*. If 402*a* is true, the one or more processors may set the penalty for the path segment based on or equal to 0 at 404.

For the computation of the shortest path segment, the weight of each arc is modified based on or as:

Weight=distance×(1+penalty)

In the example of the equation above, increasing the penalty by a factor of 1 will be equivalent to increasing the distance accepted to avoid the steep segment by the length of that segment. For example, if the first profile is selected, a path segment with a steepness of 15% and length d will be penalized such that the algorithm will prefer taking a (flat) path that is up to 3 times longer than the path segment with the steepness of 15%.

With the weights computed, the one or more processors may perform hierarchical optimization, making elevation gain the first objective to achieve before maximizing the path segment scores. This may mean that, at each iteration, the selected insertion (path segment) is the one that one of maintains the cumulative elevation gain or moves the cumulative elevation gain closer to the target elevation gain. If several possible path segments for insertion (addition to the tour) have the same impact on the cumulative elevation gain, the one or more processors choose the one among several possible path segments that maximizes the path segment score. Once the tour's elevation gain is within a predetermined range of the target elevation gain, the one or more processors choose later path segments to insert to maximize the path segment score while still keeping the cumulative elevation gain with the predetermined range of the target elevation gain.

The hierarchical optimization may not achieve the target elevation profile, however, if regions of appropriate elevation are not close enough. More precisely, the preprocessed weighted shortest path segments that link points which are within a cutoff distance from each other are used, as discussed above. When considering a new insertion at each iteration, the number of possibilities depends on the number of arcs that are linked with shortest path segments to the tour. Therefore, the larger the cutoff distance, the more alternatives are possible and the more likely it is to find a path segment that adjusts the cumulative elevation gain toward the target elevation gain.

Figure 8:
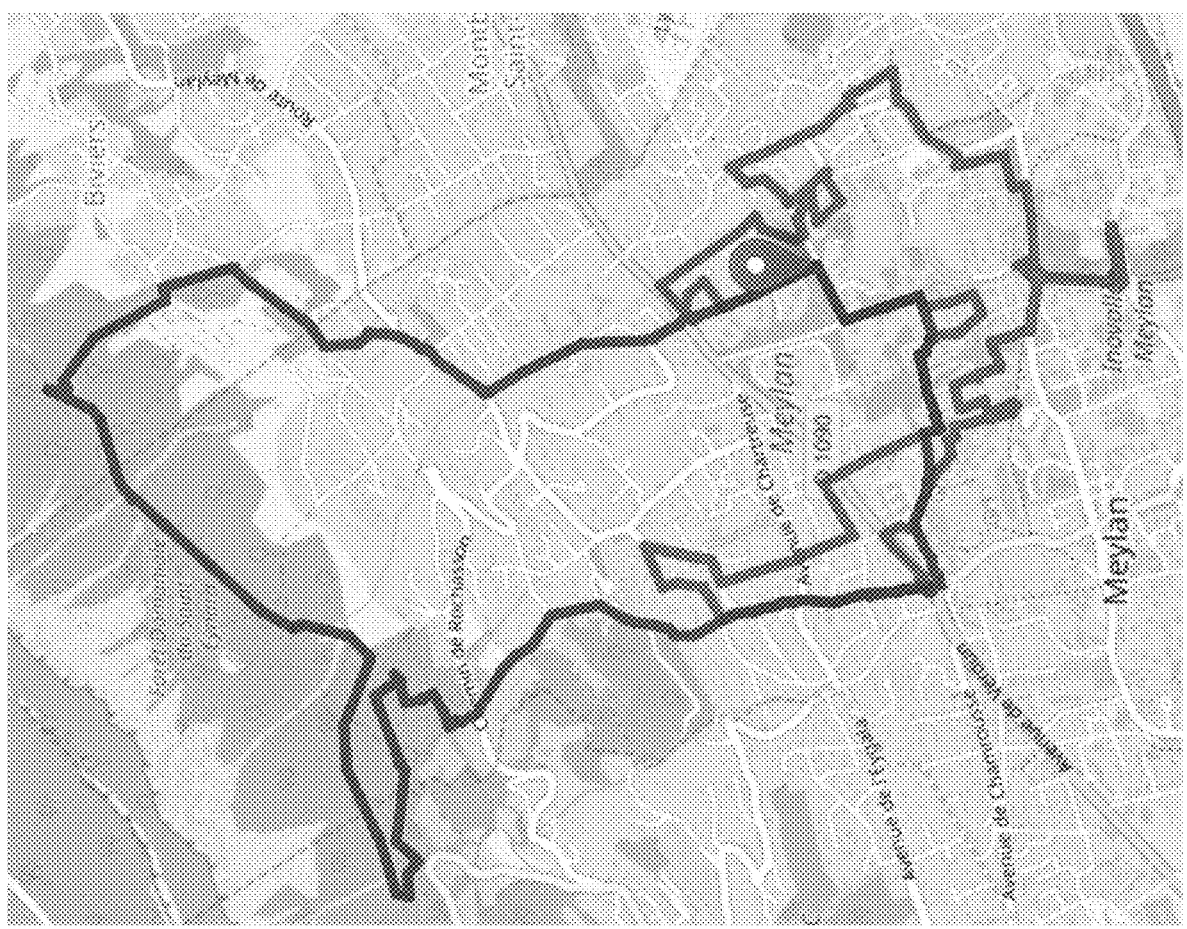
FIG. 8 is an example of two closed pedestrian tours generated based on the same preferences but with different tour generation criteria.

FIG. 8 includes an example of two tours generated using the same user preferences but with different cutoff distances used in the shortest path segments preprocessing. The tour illustrated by dashed lines was generated using a larger cutoff distance than the path illustrated by the dotted lines. The tour generated with the larger cutoff distance (illustrated by the dashed lines) provides an elevation gain that is within the predetermined range of the target elevation gain, and the tour has a relatively good score. The tour generated with the smaller cutoff distance (illustrated by the dotted lines), however, does not provide an elevation gain that is within the predetermined range of the target elevation gain. Instead, the tour with the smaller cutoff distance includes several smaller arcs that bring little elevation gain. This tour does not satisfy the elevation gain portion of the user preferences and has a relatively poor geometry. This tour will therefore have a lower score than the tour generated using the larger cutoff distance.

Figure 9:
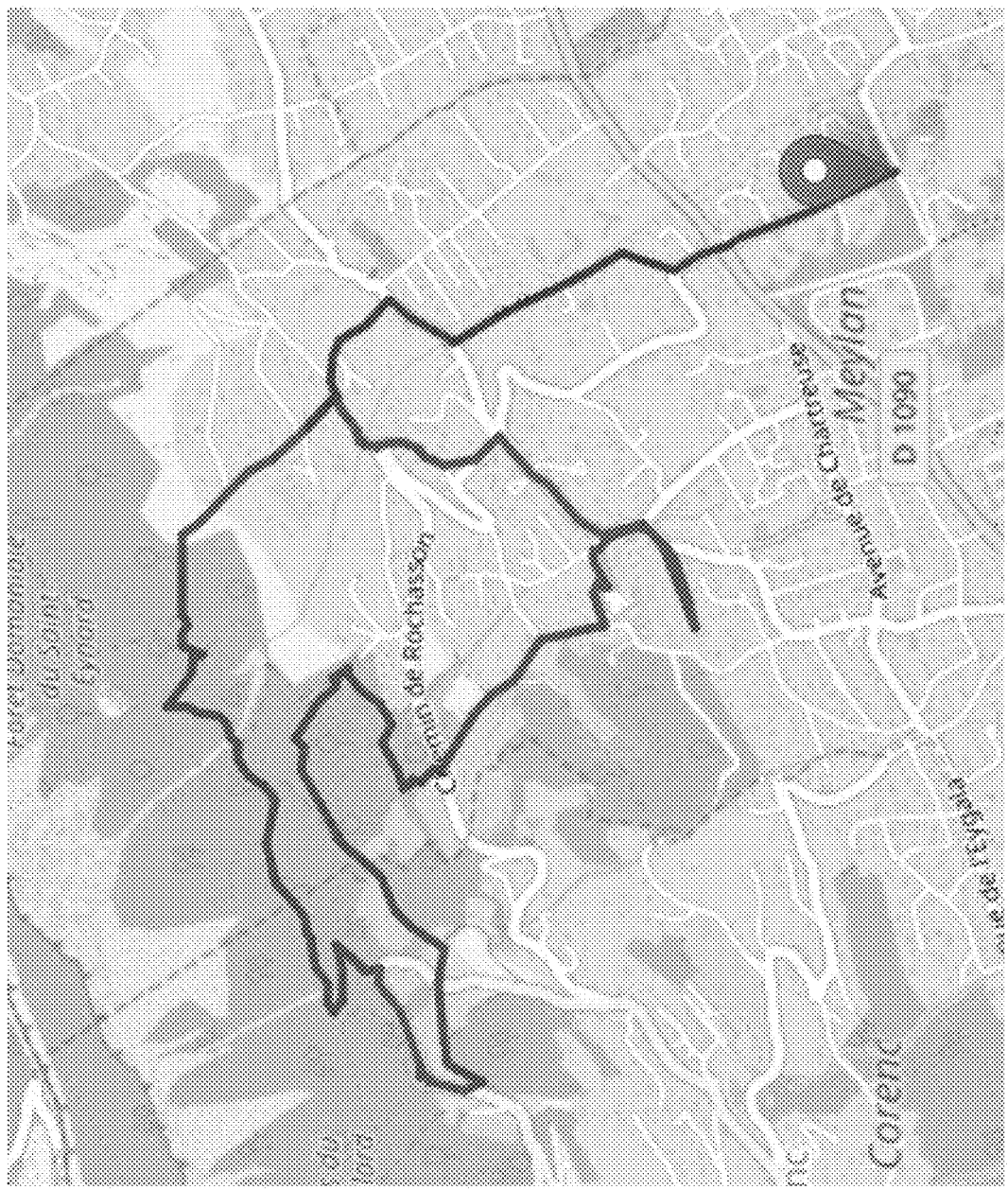
FIG. 9 is an example of a closed pedestrian tour generated using an intermediary point.

The larger the cutoff distance, however, the greater the preprocessing that is performed. The selection of the intermediate point that is at an appropriate minimum elevation and generating the tour to include the shortest path segment to reach that point from the starting point may provide better tours that also achieve the target elevation gain. FIG. 9 includes an example graph including a tour generated by selecting an intermediate point, as described above. In this case, the tour will start and end with the same access path between the starting and intermediate point.

Flexible Paths

The one or more processors may allow for one or more changes to be made while a user traverses a generated tour with the user device 14. For example, the one or more processors may adjust the tour (e.g., duration and/or distance) to increase the length of the tour or to decrease the length of the tour in response to user input to the user device 14 during the tour to increase the length of the tour or to decrease the length of the tour. Additionally or alternatively the one or more processors may adjust the tour to follow the path of an alternative tour if the user deviates from the tour and follows an alternative tour. Additionally or alternatively, the one or more processors may adjust the tour to provide the user with a shortest possible route back to the starting location in response to user input to the user device 14 during the tour, such as an indicator of an emergency.

The one or more processors allow for geographic flexibility and time flexibility when proposing one or more changes while a user traverses a generated tour with the user device 14. Geographic flexibility may involve the one or more processors identifying areas and/or alternative paths around the initial tour that match the user preferences and that are of roughly the same quality (scorewise) as the paths of the original tour. The areas and/or alternative paths may allow users to explore surroundings without strictly following the original tour. Time flexibility may involve adjusting the tour in response to user input regarding a change in the length and/or overall period (time) of the tour during the tour. The one or more processors update the tour in response to such a change requested during the tour to increase the length of the tour or to decrease the length of the tour. This allows for flexibility, for example, based on a change in weather or based on user feeling (e.g., exhaustion or energy) during the tour.

To make a generated (original) tour more flexible, the one or more processors determine one or more alternative paths (arcs) that branch from the tour and that can be used to replace path segments of the original tour. Of all of the alternative paths possible, the one or more processors select alternative paths that have scores that are similar to the scores of the path segments that are removed from the original tour.

Figure 10:
FIG. 10 is an example pedestrian tour segmented according to score.
Figure 11:
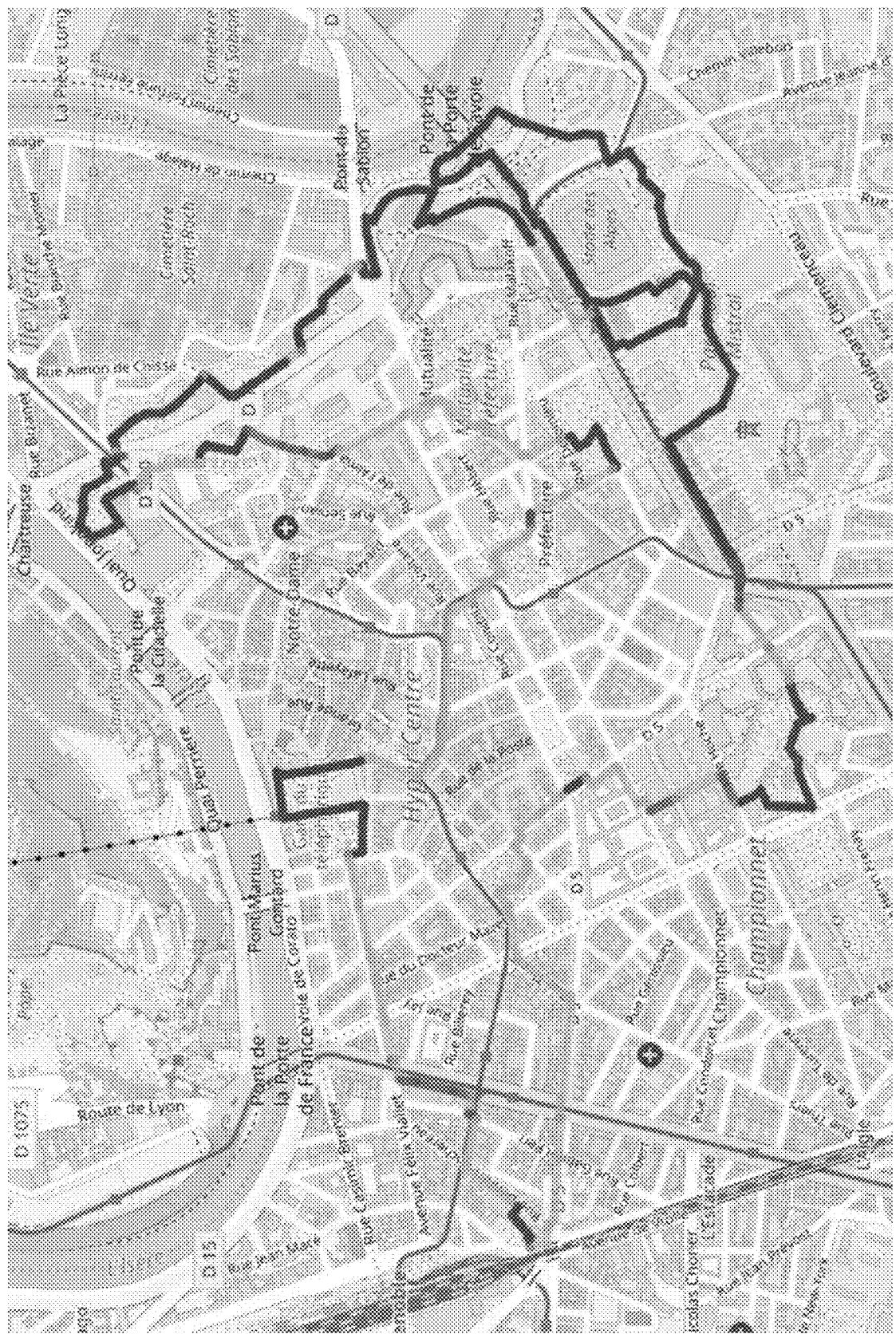
FIGS. 11-14 include example graphs of pedestrian tours generated with alternative paths inserted into segments of an original tour within a city (urban area)
Figure 12:
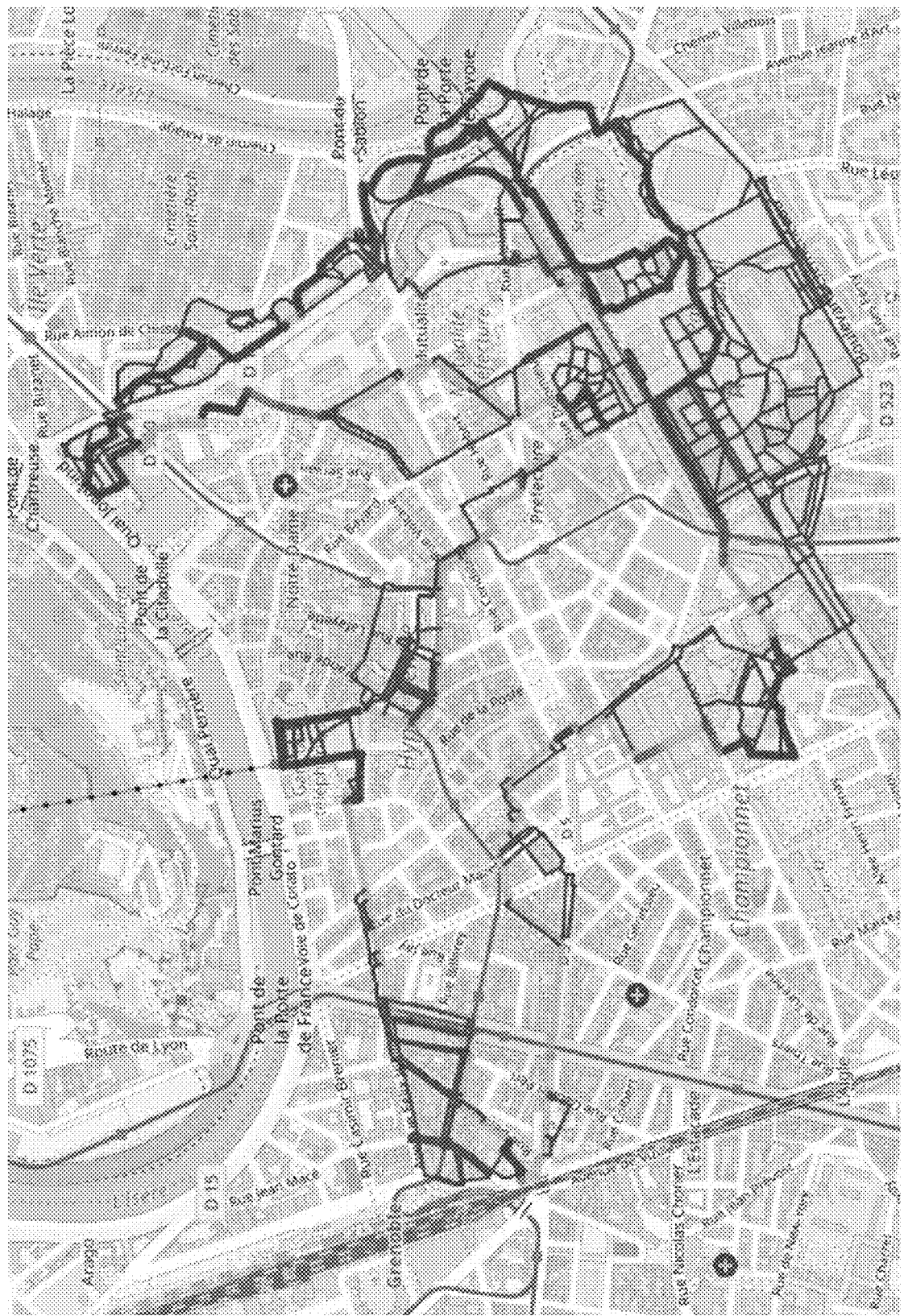

As discussed above, the one or more processors determine the score of a path based on its mean score, that is, its score for its distance. The one or more processors discretize the mean score of each path by dividing the total score of the path divided by its total distance. The one or more processors assign a quality category to each path based on the score. For example, the one or more processors may assign a first quality category to paths having scores that are within a first predetermined score range, assign a second quality category to paths having scores that are within a second predetermined score range, assign a third quality category to paths having scores that are within a first predetermined score range, and a fourth quality category to paths having scores that are within a fourth predetermined score range. While the example of four quality categories is provided, a greater or lesser number of quality categories may be used. The first quality category may correspond to paths having minimal quality (e.g., roads with vehicle traffic). The second quality category may correspond to paths having reasonable quality, greater quality than paths of the first quality category (e.g., pedestrian paths). The third quality category may correspond to paths having good quality, greater quality than paths of the second quality category (e.g., pedestrian paths close to nature, such as boundaries of parks). The fourth quality category may correspond to paths having excellent quality, greater quality than paths of the third quality category (e.g., pedestrian paths in parks or through nature). FIG. 10 includes an example pedestrian tour segmented according to score. While the example of quality categories is provided, the present application is also applicable to other ways of identifying flexible paths.

The one or more processors determine the score of a path by (1) selecting a part of the original tour that might be replaced with alternative paths and (2) looking for acceptable replacements to the part of the original tour to be replaced.

The one or more processors may (1) select the part of the original tour to be replaced using a sliding window approach or a segmentation approach. For the sliding window approach, the one or more processors define a sliding window with a fixed predetermined distance D. The one or more processors move the window from node to node over the successive nodes of the original tour, starting from the first node of the original tour (the starting location). At each step, the one or more processors move the sliding window to the next node as a starting node to cover all of the subsequent nodes of the tour that lie within the distance D and are before the end node of the tour (the ending location). At each step, the one or more processors determine possible insertions in the surrounding area between the first node of the sliding window $N_0$ and each of the subsequent nodes within the sliding window $N_i$.

For the segmentation approach, the one or more processors segment the original tour according to the score of its constituent arcs. In other words, the one or more processors identify disjointed sub-sequences of the original tour that are similar in terms of score. The one or more processors may discretize the scores according to the four quality categories discussed above using a change point algorithm to detect segments, such as an algorithm from the rupture1 python library. FIG. 10 includes an example graph including a tour segmented into example segments. Markers indicate the beginning and end of each segment, while the colors indicate the quality (e.g., category) of the segment. Segments belonging to the best (e.g., fourth) category are illustrated in green, segments belonging to the worst (e.g., first) category are illustrated in red. Segments belonging to an intermediate category (e.g., second or third) may be illustrated in another color, such as yellow. Within each segment, the one or more processors determine possible insertions between (e.g., each) pairs of nodes within the segment.

The one or more processors may (2) identify acceptable replacements to the part of the original tour to be replaced as follows. Each subsection (segment) is defined by a pair of nodes ($N_{start}$, $N_{end}$) representing the portion of the original tour that links the pair of nodes to be replaced. The one or more processors verify characteristics of possible insertions in order to decide whether the possible insertions are acceptable alternatives or not. For each possible insertion, the one or more processors verify that an alternative tour with the possible insertion does not include any duplicate nodes within the tour. This increases a quality of the tour and also avoids the tour from proceeding back and forth between two nodes. The one or more processors determine the quality category of the possible insertion and, based on the category, the one or more processors may verify additional constraints with respect to the mean score and the distance changes introduced by the possible insertion relative to the original tour. If the possible insertion satisfies all of the additional constraints, the one or more processors retain the possible insertion as a possible alternative path. The determination of alternative paths may be described by the following pseudo code.

alternative_paths=[ ]
For each node pair ($N_{start}$, $N_{end}$):
For each arc ($a_1$, $a_2$) in the surrounding graph:
  Determine insertion of arc ($a_1$,$a_2$) between $N_{start}$ and $N_{end}$ using the shortest-paths ($N_{start}$, $a_1$) and ($a_2$, $N_{end}$) as linking paths. The resulting insertion, the path ($N_{start}$, $a_1$) ($a_1$, $a_2$) ($a_2$, $N_{end}$), called inserted_path below, is a possible replacement for the path linking ($N_{start}$, $N_{end}$) in the original tour path, called replaced_path below.
  Verify that the alternative tour, with inserted_path replacing replaced_path, does not contain any duplicate nodes. If any duplicate nodes, reject the insertion.
  Determine the quality category of the inserted_path. For example, assign the inserted_path to one of the quality categories 1, 2, 3, or 4, as described above.
  Depending on the category of the inserted_path, determine the corresponding cost_threshold and score_threshold (described below) and verify that inserted_path, compared with the replaced_path, complies with the following constraints:

Cost( inserted_path ) ≤ cost_threshold * Cost( replaced_path ) and
Score( inserted_path ) / Cost( inserted_path ) ≥ score_threshold * Score( replaced_path ) / Cost( replaced_ path)

If the inserted_path does not satisfy the constraints, reject the inserted_path. If the inserted_path satisfies all of the constraints, add inserted_path to alternative_paths with the information about the changes it introduces compared to the replaced_path in the original tour in terms of cost and score.

The cost of a path corresponds to the distance it covers, and the score to its pleasantness (quality). Both the cost of a path and the score of the path are computed from the paths arcs, as described above. With respect to the score_threshold and cost_thesholds, examples are as follows:

|  | Cost_threshold for categories [1, 2, 3, 4] | Score_threshold for categories [1, 2, 3, 4] |
| --- | --- | --- |
| Relaxed setting | [1.0, 1.1, 1.5, 2] | None |
| Strict setting | [1.0, 1.0, 1.25, 1.5] | [1.0, 1.0, 0.95, 0.9] |

While examples of cost and score thresholds are provided, other threshold values may be used.

FIGS. 11-14 include example graphs of tours generated with alternative paths (blue) inserted (FIGS. 12-14) into segments of an original tour (FIG. 11) within a city (urban area). FIGS. 15-18 include example graphs of tours generated with alternative paths (blue) inserted (FIGS. 16-18) into segments of an original tour (FIG. 15) within a residential area. The examples of FIGS. 11-18 were generated based on a window size of 500-1000 m and a cutoff value of 1000-3000 m.

The one or more processors insert pleasant alternative paths. The higher the score of the insertion, the more relaxed the thresholds may be when determining compliance with the constraints with respect to both an acceptable increase in cost and an acceptable decrease in score. The thresholds may be fixed predetermined discrete values associated with each quality category. In various implementations, the one or more thresholds may determine the thresholds as a function of the mean score of a path, for example, using one of a function and a lookup table that relate mean scores to cost and score thresholds. In various implementations, the one or more processors may also consider one or more other characteristics, such as elevation gain and/or steepness.

The window size used or the length of the segments found impacts the number of node pairs considered for replacement with alternative paths. The window size and the cutoff parameter described above (used to determine the shortest paths considered) impact the total number of possible insertions considered. These parameters in addition with the cost threshold may limit the distance an alternative path may cover and thus how much an alternative path may deviate from the original tour. While an example window size of 500-1000 m and an example cutoff value of 1000-3000 m is illustrated, other window sizes and/or cutoff values may be used. In various implementations, the one or more processors may set the window size and the cutoff value based on surroundings of the tour. For example, the one or more processors may set the window size and the cutoff value to first predetermined values (e.g., 500 m and 1000 m respectively) for tours near or in a city (urban area) and to second predetermined values (e.g., 1000 m and 3000 m respectively) for tours near or in rural areas. The second predetermined values are greater than the first predetermined values, respectively.

In various implementations, the one or more processors may limit the maximum distance between pairs of nodes to consider within a segment. This may help avoid lengthy deviations from the original tour.

Figure 19:
FIG. 19 includes a graph including an example original tour and alternative paths.

FIG. 19 includes a graph including an example original tour and alternative paths (blue) generated as described above. In various implementations, the one or more processors may visually indicate on the display only the most pleasant alternative paths and/or the most interesting alternative paths, such as alternative paths having scores greater than a predetermined value or X alternative paths with the highest scores, where X is an integer greater than zero. The one or more processors may display on the display alternative paths and/or sections of the tour where flexible/alternative paths may be followed before the user begins the tour and/or while the user is traversing the route of the tour, such as illustrated in the example of FIG. 19. The one or more processors may or may not generate an output (audible, visual, and/or haptic) when a user enters or leaves an alternative path from a tour. In various implementations, the one or more processors may display on the display alternative paths and/or sections of the tour where flexible/alternative paths may be followed along with a new tour provided by the one or more processors in response to user input to adjust a target length of the tour (e.g., as in the examples of FIGS. 21, 23, 25, and 27).

For each accepted alternative path, the one or more processors store data about the changes in score and distance introduced into the original tour. Each alternative path may be either roughly equivalent to the replaced segment or increase or decrease the cost and/or distance of the original tour. Based on the stored data, the one or more processors may inform the user via the user device 14 (e.g., audibly and/or visibly) during traversal of the tour. This may allow the user to dynamically choose among possible alternatives.

Figure 13:
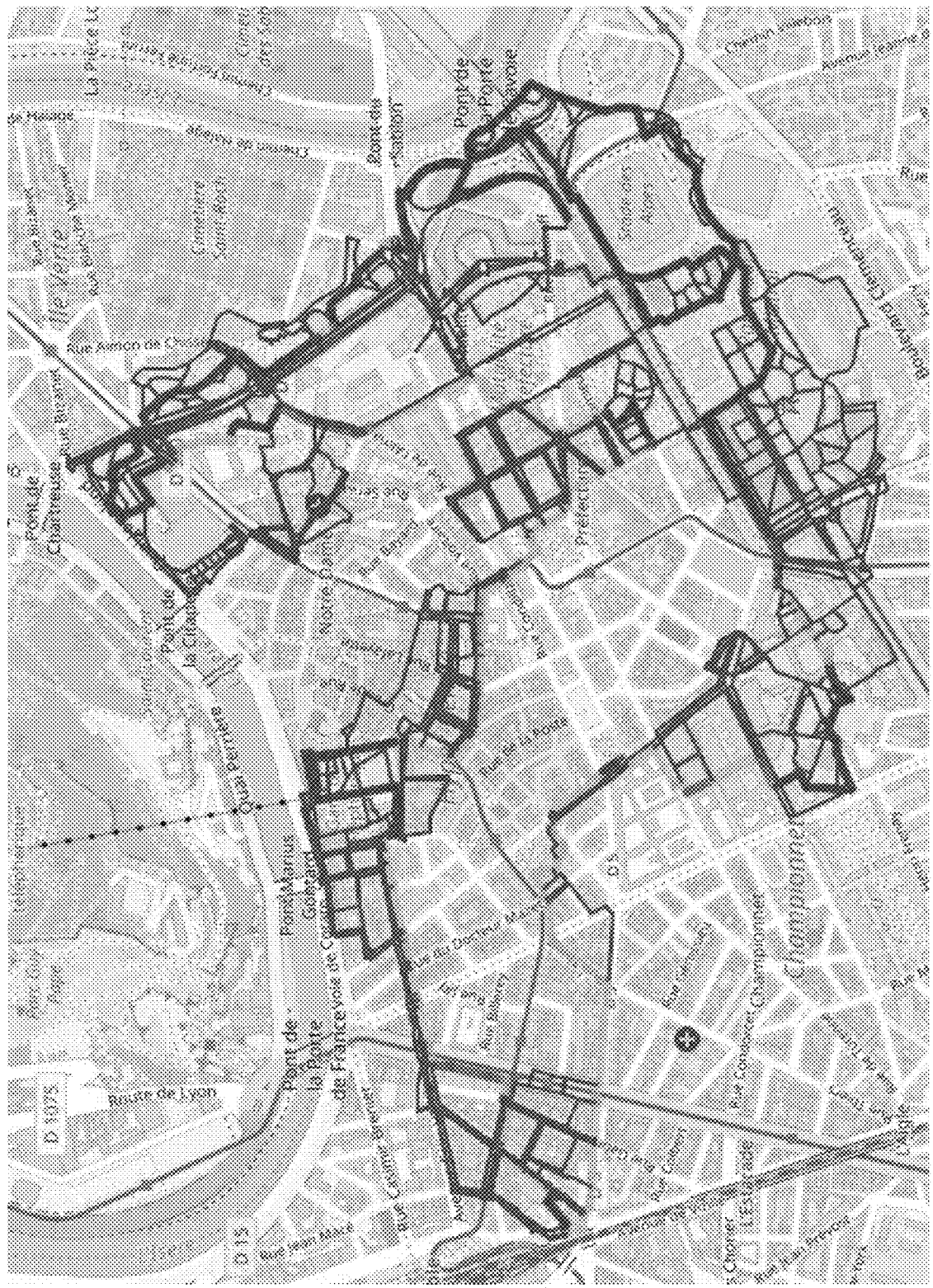
Figure 14:
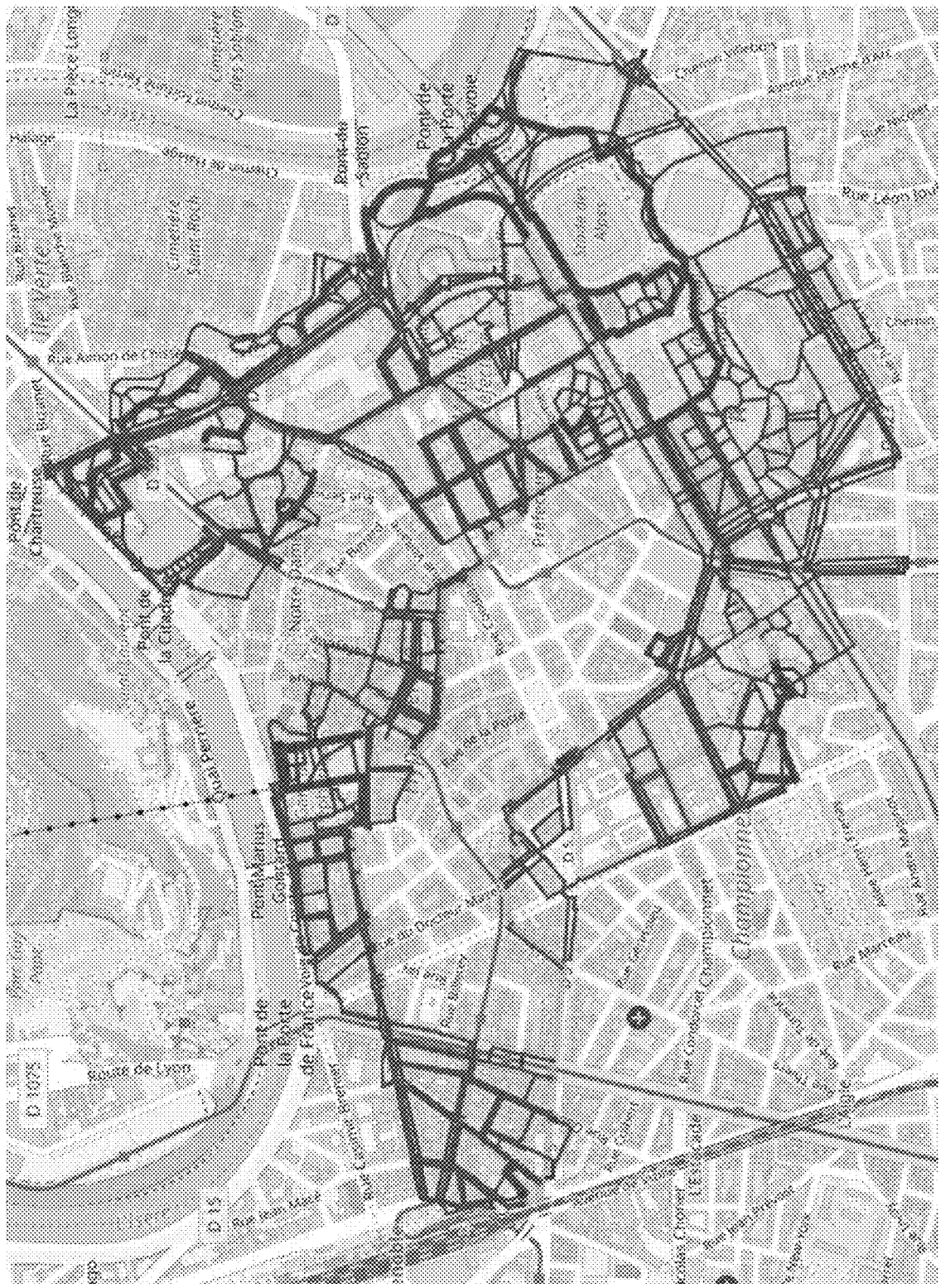
Figure 15:
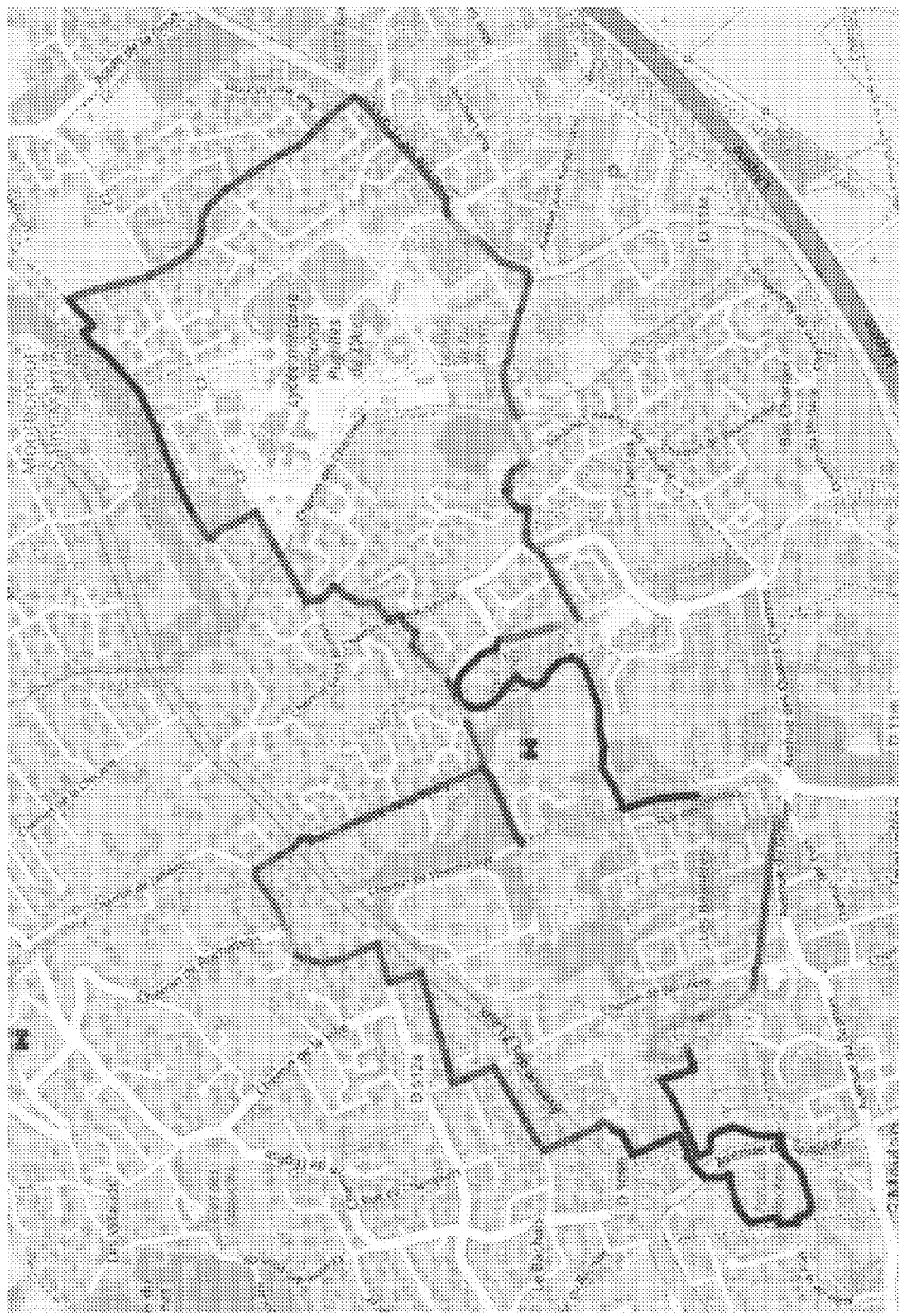
FIGS. 15-18 include example graphs of tours generated with alternative paths inserted into segments of an original tour within a residential area.
Figure 16:
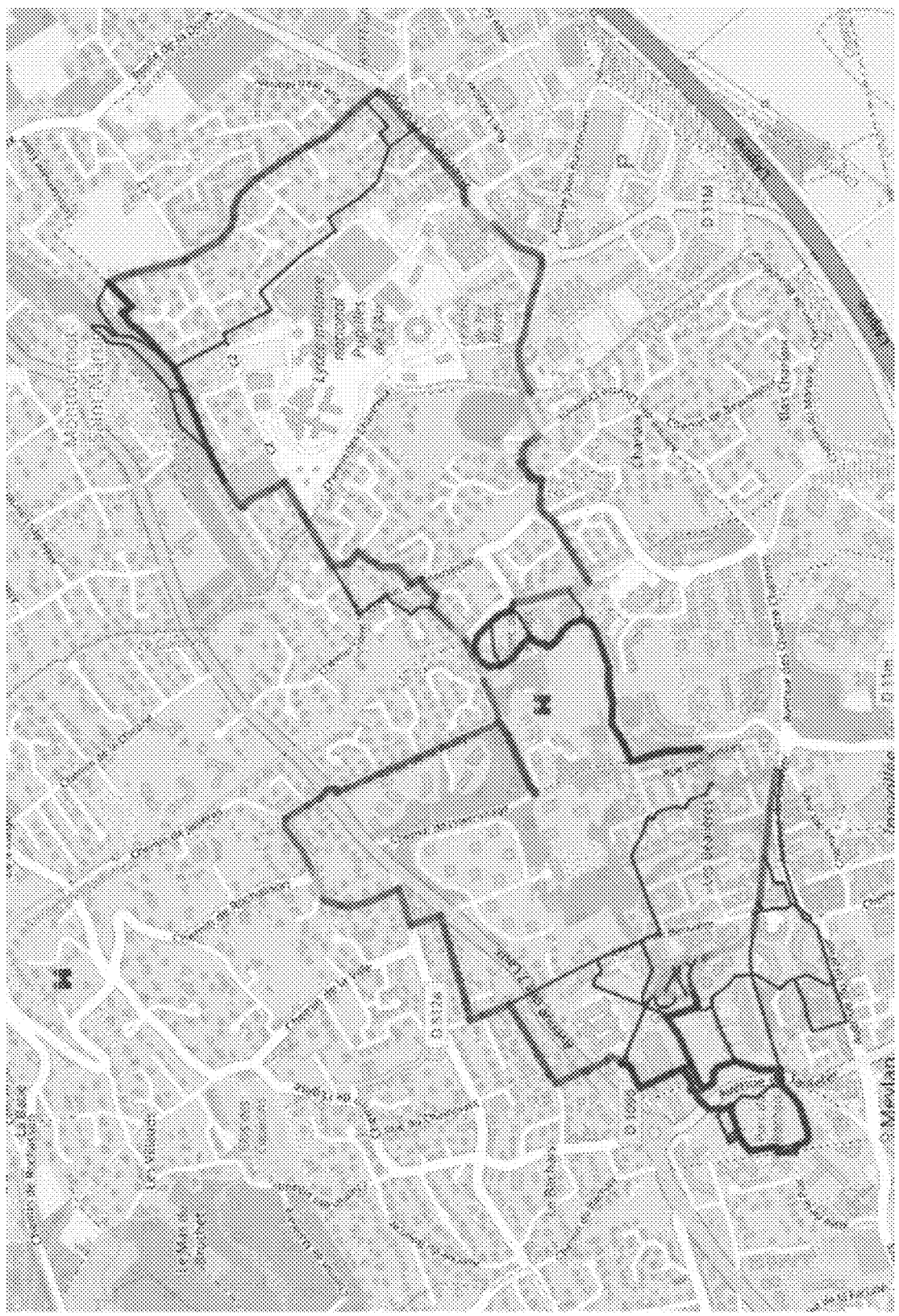
Figure 17:
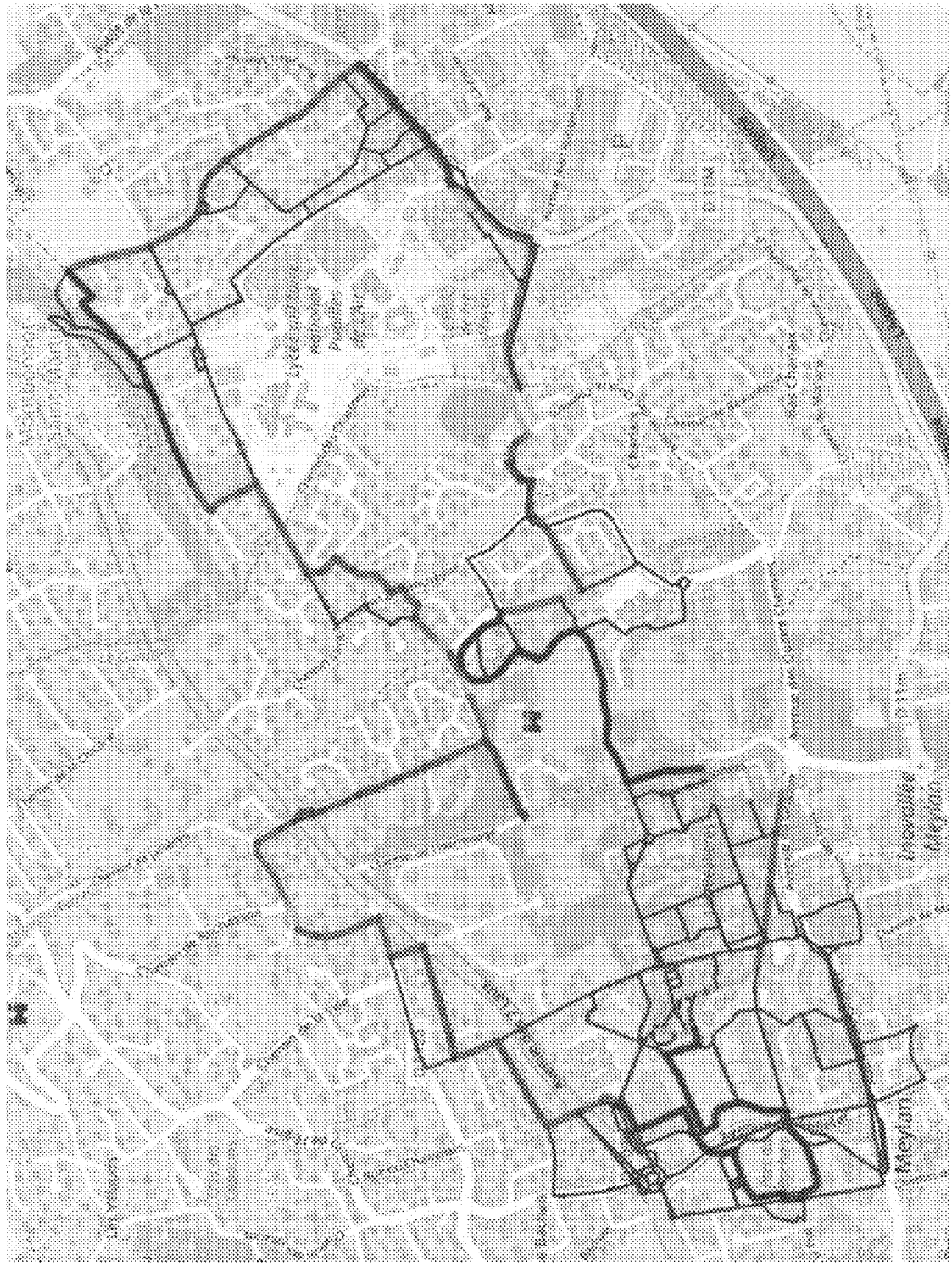
Figure 18:
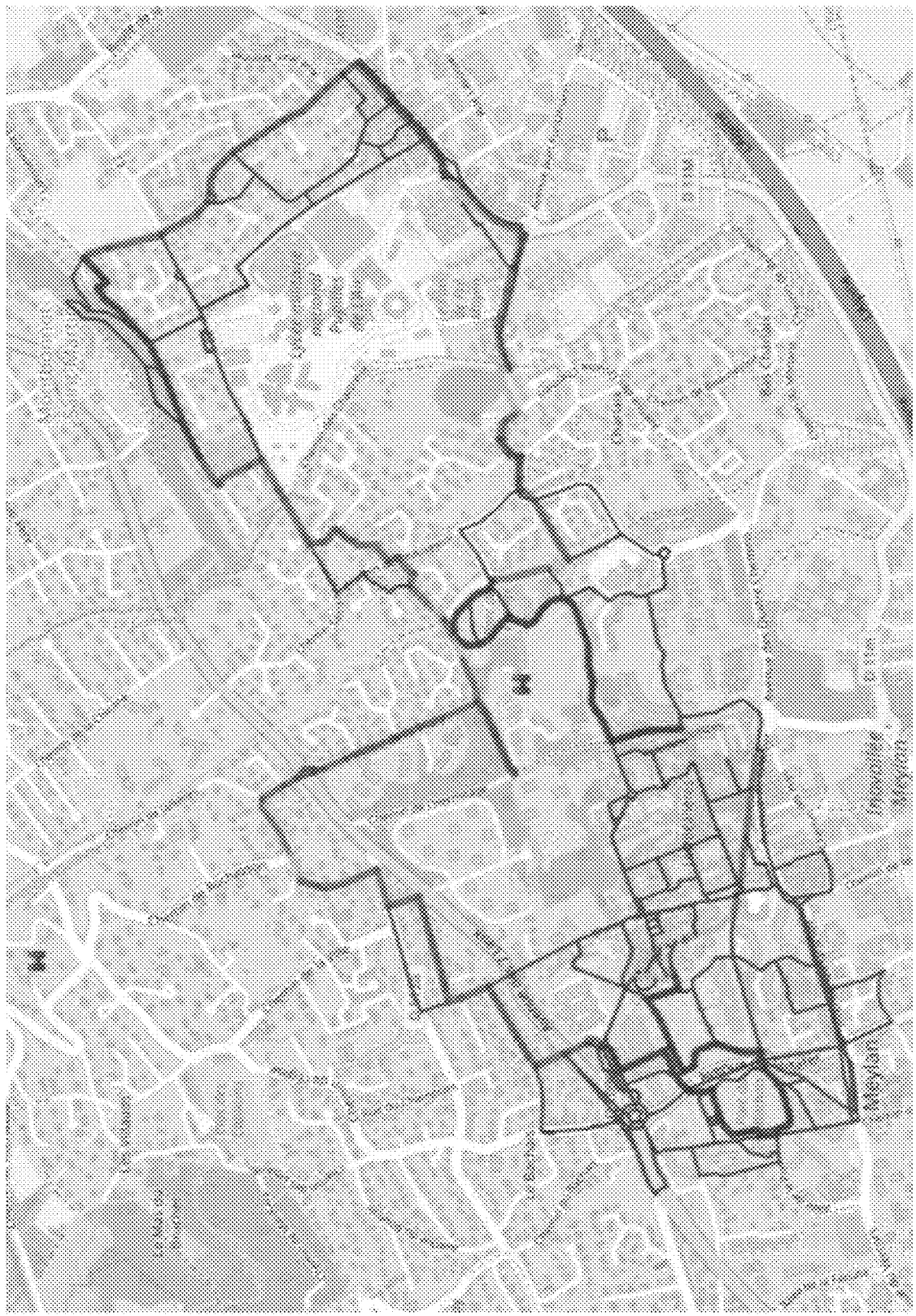

In various implementations, the one or more processors may set the thresholds in response to user input. For example, the user may input to the user device 14 a preference of whether the user desires that the tour have a target distance (sacrificing alternative paths) or that the tour be more flexible target distance wise while allowing the user to explore (e.g., pleasant paths) more. Based on the user input, the one or more processors may set the score threshold and the cost threshold to best achieve the user preferences. For example, FIG. 13 and FIG. 17 illustrate adherence to the target distance and less exploration flexibility. FIGS. 12, 14, 16, and 18 illustrate less adherence to the target distance and more exploration flexibility.

Dynamic Path Updating

As stated above, the one or more processors may allow for one or more changes to be made while the user traverses a generated tour with the user device 14. Given an initial tour and that part of the initial tour has been completed, the one or more processors may update the tour in response to user input to the user device 14 to change the target distance and/or the target period (time) of the tour. For example, in response to user input to increase at least one of the target distance and the target period, the one or more processors may increase the length of the tour and transmit the updated tour (of increased length) to the user device 14 for presentation on the user device 14. In response to user input to decrease at least one of the target distance and the target period, the one or more processors may decrease the length of the tour and transmit the updated tour (of decreased length) to the user device 14 for presentation on the user device 14.

The one or more processors may also update the tour based on an updated end location provided via user input from the user device 14.

For example, the one or more processors may initialize the current_path with either (a) the original remaining path if the target distance is longer than the original target distance or (b) to the shortest path between the current location and the endpoint if the target distance is shorter than the original target distance. The one or more processors may iterate the following a. define a route by selecting (e.g., randomly) a set of R (current_path) arcs to change;
b. between each pair of consecutive (and not necessarily adjacent) arcs AB, EF of the route:
  i. determine possible insertions of a new arc CD into the current_path by replacing the current segment from B to E by the sequence SP (B,C), CD, SP(D,E), where SP is the shortest path (SP)
  ii. keep only possible insertions that satisfy the distance and elevation constraints and do not include already visited nodes
c. update the current_path by inserting (e.g., randomly) one possible insertion from the K possible insertions having the highest scores.

In the above, R is a function of the length of the current path and the maximum length of the precomputed shortest paths. The number of arcs to consider for insertion is limited by the maximum length of the computed shortest paths. K (an integer greater than or equal to 1) defines the strategy of the underlying local search algorithm. The smaller K is, the greedier the algorithm is. For example, when K is equal to one, the best possible insertion will be the best possible insertion (having the highest score). The larger K is, the more exploratory the search may be (as the pool of possible insertions is larger).

The one or more processors may stop and return the current_path (the current tour) to the user device 14 when the distance (or period) of the current_path is within a predetermined range of the target distance (or period). Alternatively, the one or more processors may stop and return the current_path (the current tour) to the user device 14 once an iteration or computation time limit is achieved.

Figure 20:
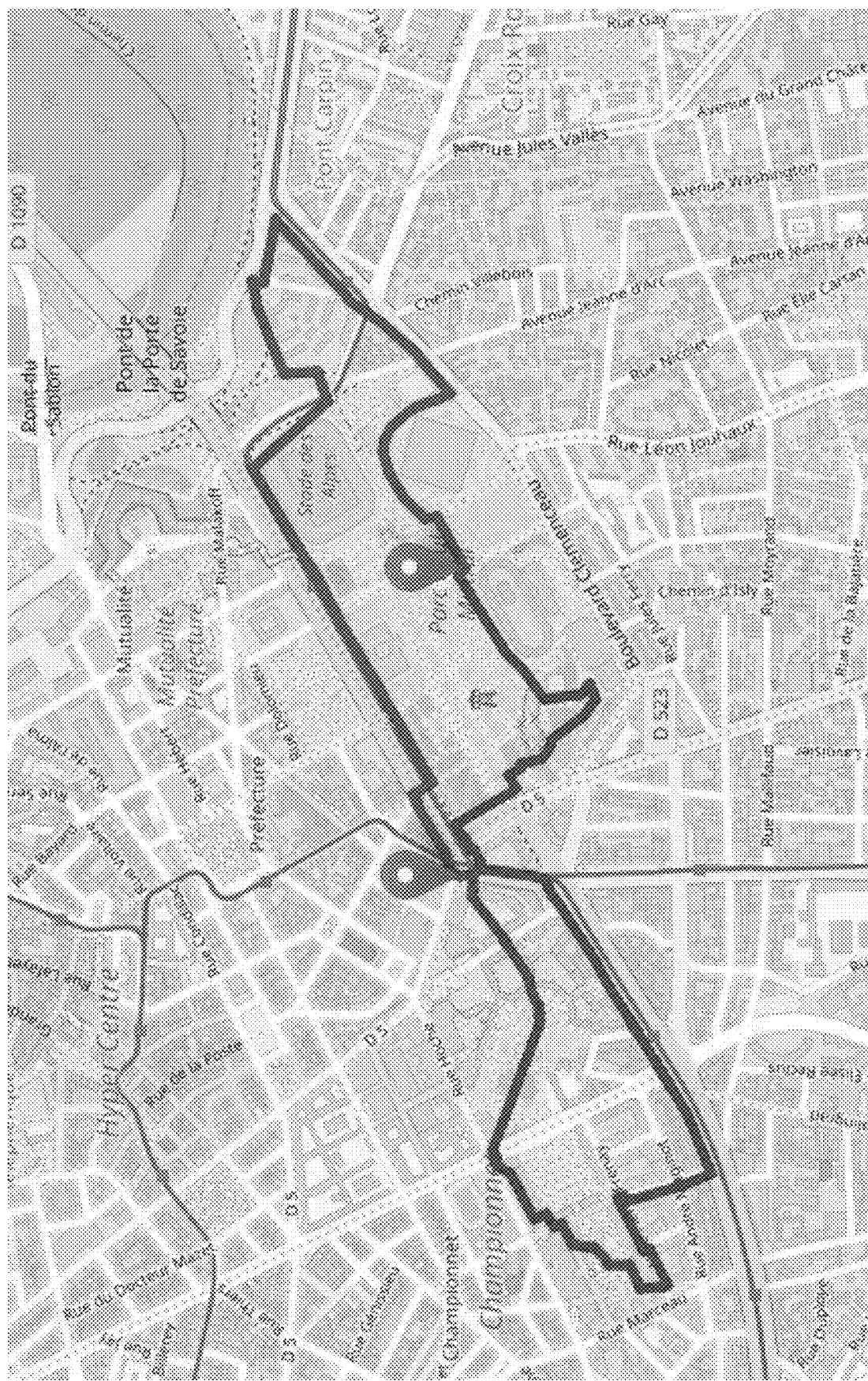
FIG. 20 is an example initial tour including an already completed section and not yet completed section.
Figure 21:
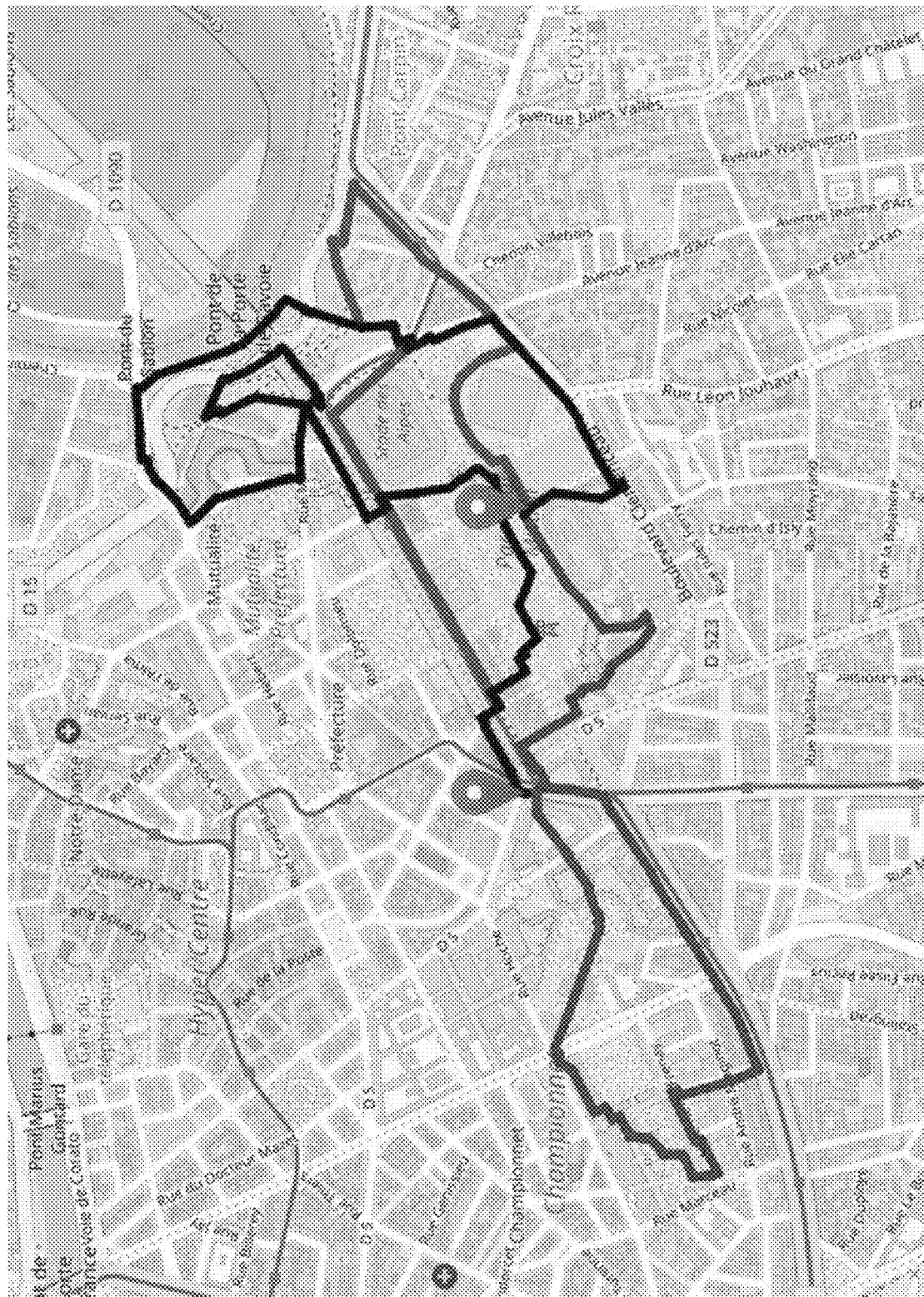
FIG. 21 is a new path generated for the remainder of the not yet completed section of the initial tour of the example of FIG. 20 in response to receipt of user input.

FIG. 20 includes an example initial tour with the already completed section illustrated in blue and the not yet completed section in red. FIG. 21 includes a new path in black generated for the remainder of the not yet completed section of the initial tour of FIG. 20 in response to receipt of user input.

Figure 22:
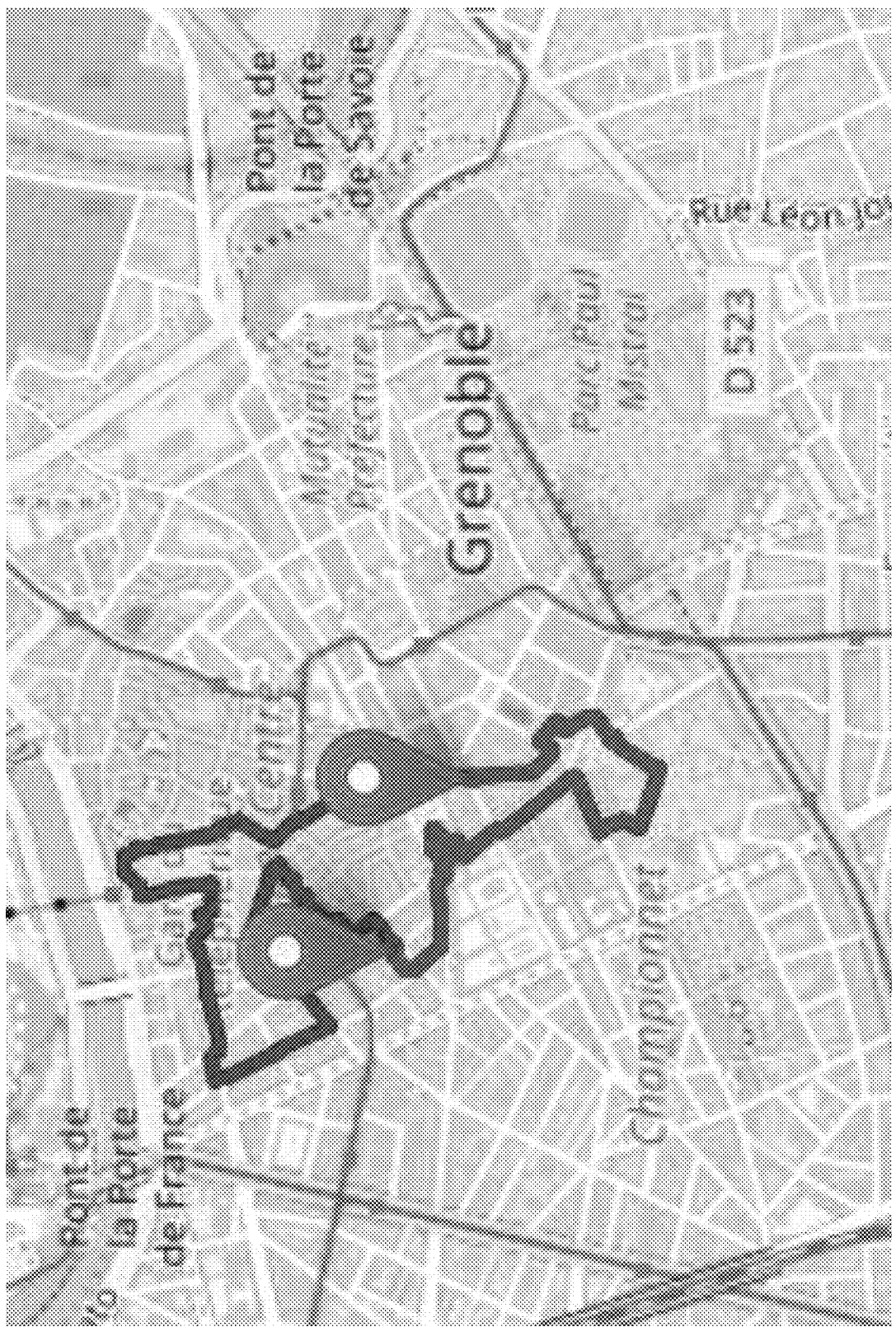
FIG. 22 is an example initial tour with an already completed section and a not yet completed section.
Figure 23:
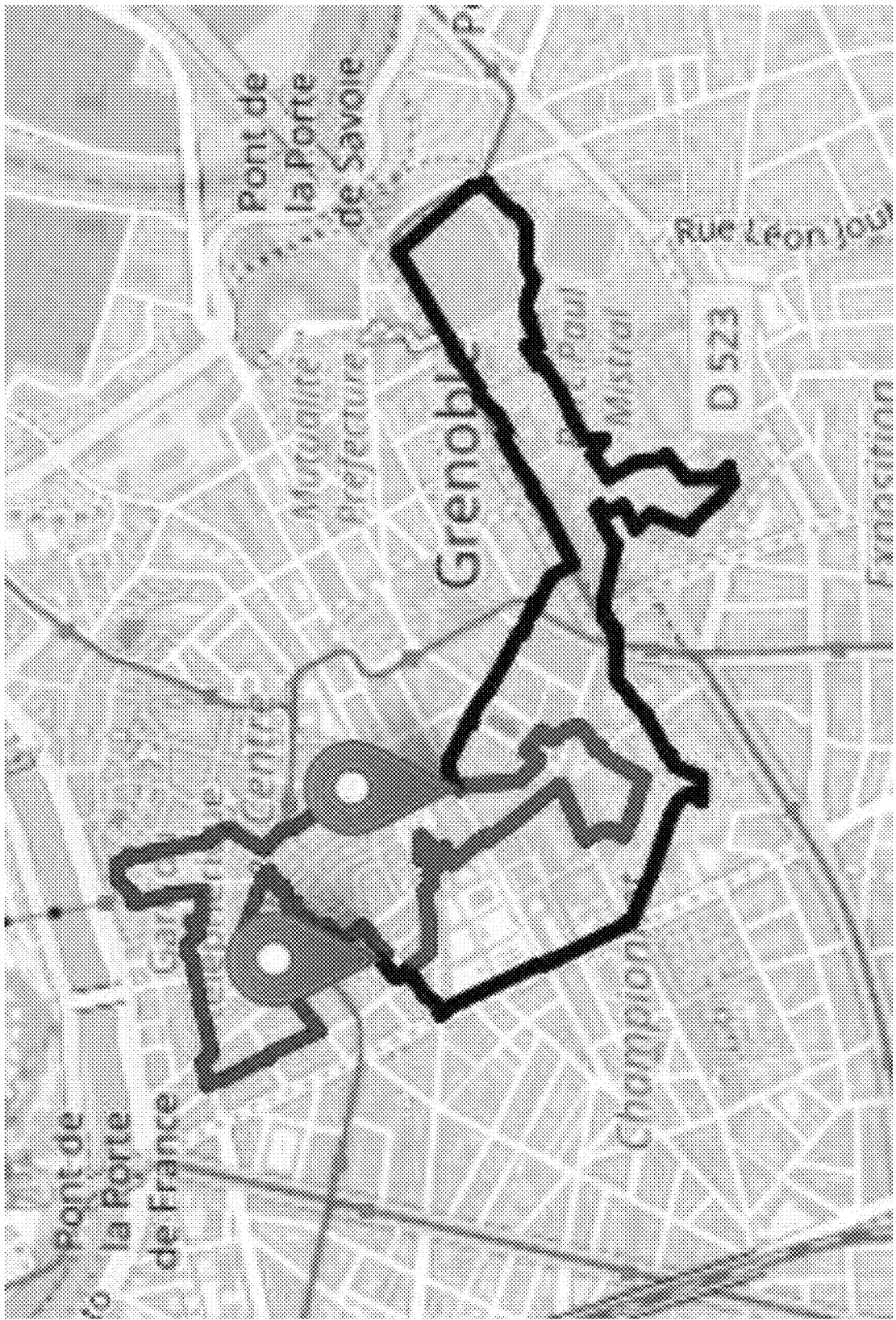
FIG. 23 is a new path generated for the remainder of the not yet completed section of the initial tour of the example of FIG. 22 in response to receipt of user input.

FIG. 22 includes an example initial tour with the already completed section illustrated in blue and the not yet completed section in red. FIG. 23 includes a new path in black generated for the remainder of the not yet completed section of the initial tour of FIG. 22 in response to receipt of user input.

When the user input is indicative of a decrease in length (target distance or period) of the tour, the one or more processors may identify and eliminate from the tour one or more of the least pleasant segments (having the one or more lowest scores) from the tour to achieve the user input (target distance or period).

Figure 24:
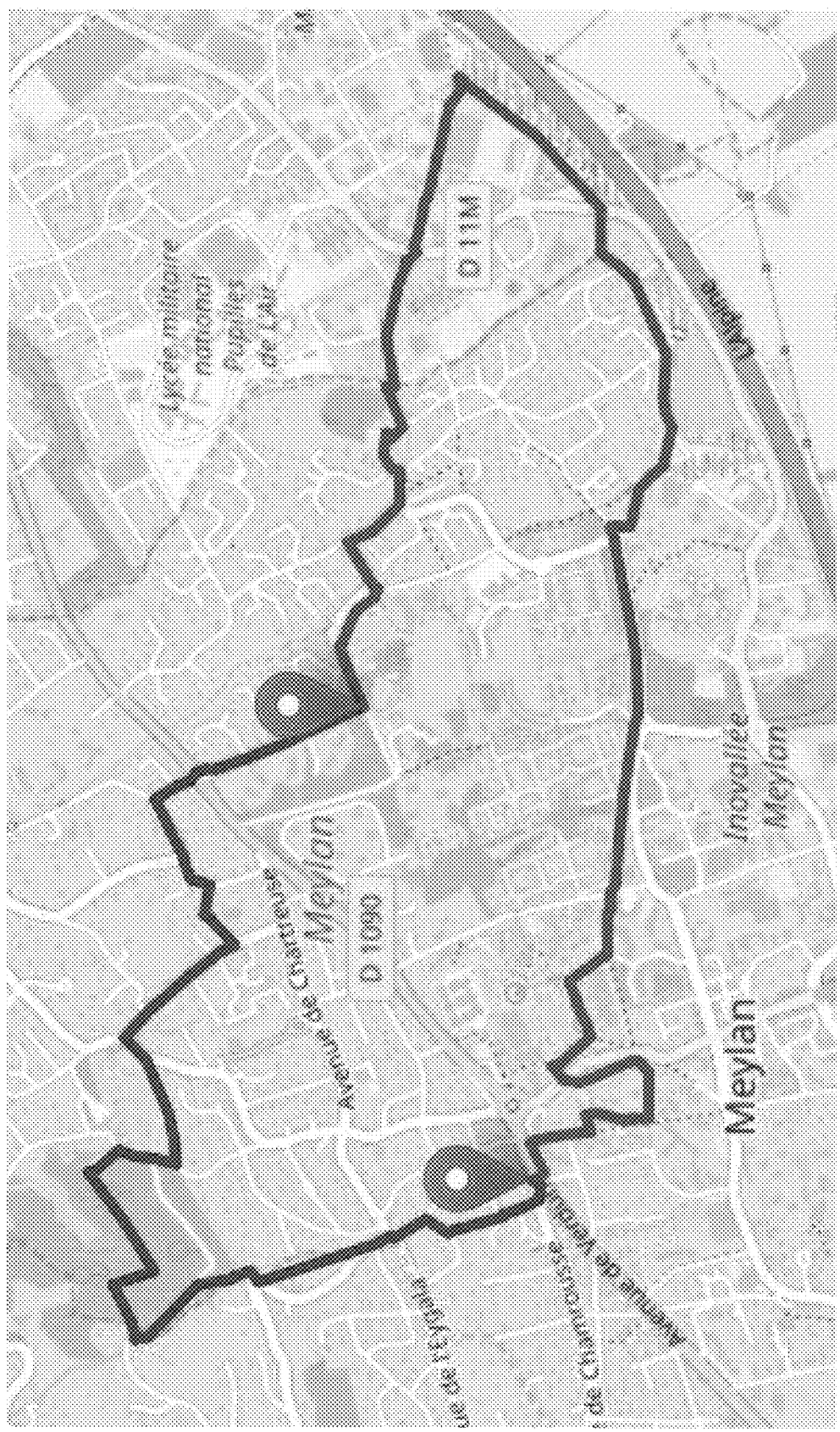
FIG. 24 is an example initial tour with an already completed section and a not yet completed section.
Figure 25:
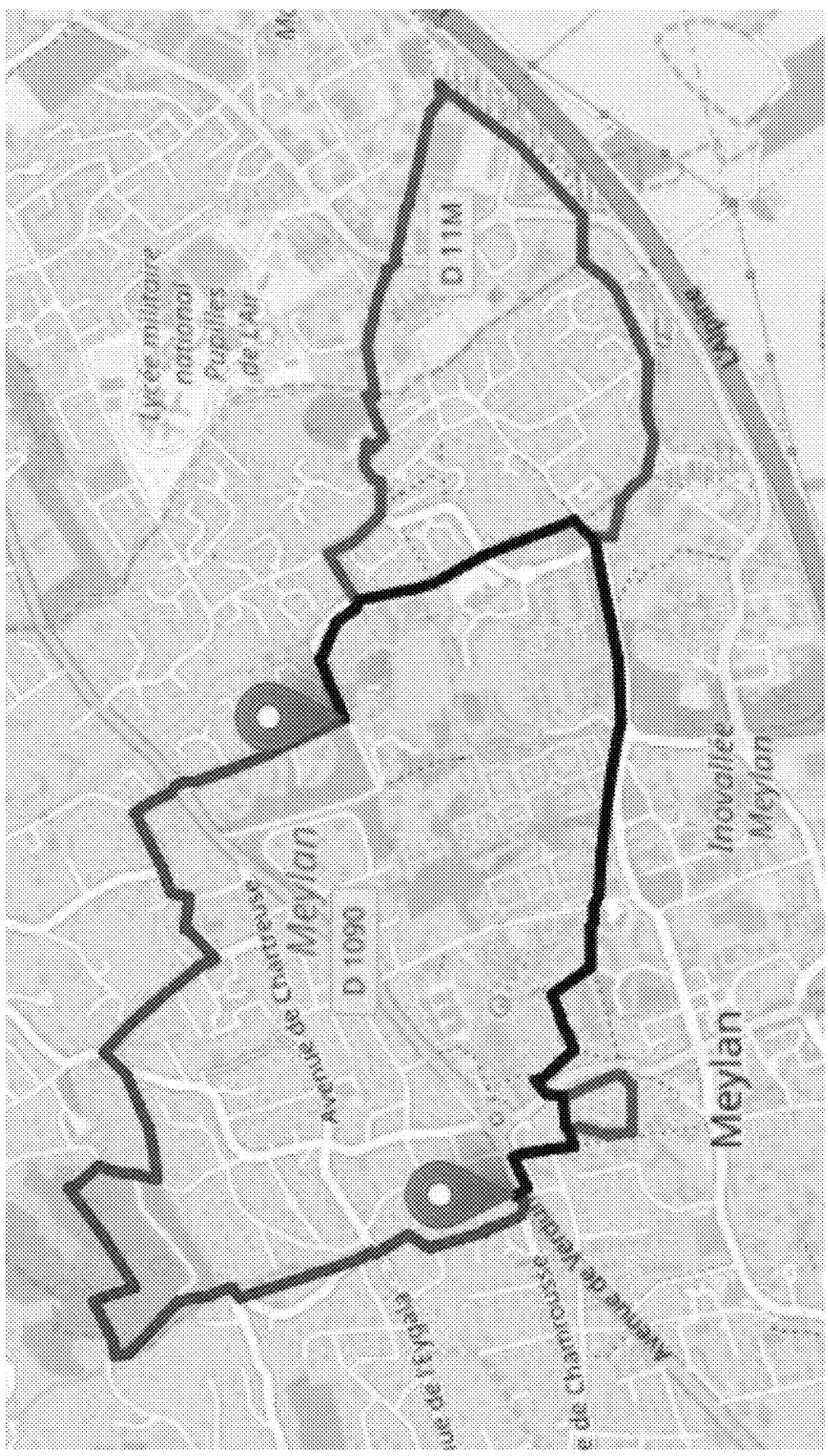
FIG. 25 is a new path generated in response to receipt of user input to decrease the length of the example tour of FIG. 24.

FIG. 24 includes an example initial tour (10 km) with the already completed section illustrated in blue (4 km) and the not yet completed section (6 km) in red. FIG. 25 includes a new path in black (3 km) generated in response to receipt of user input to decrease the length of the tour.

Figure 26:
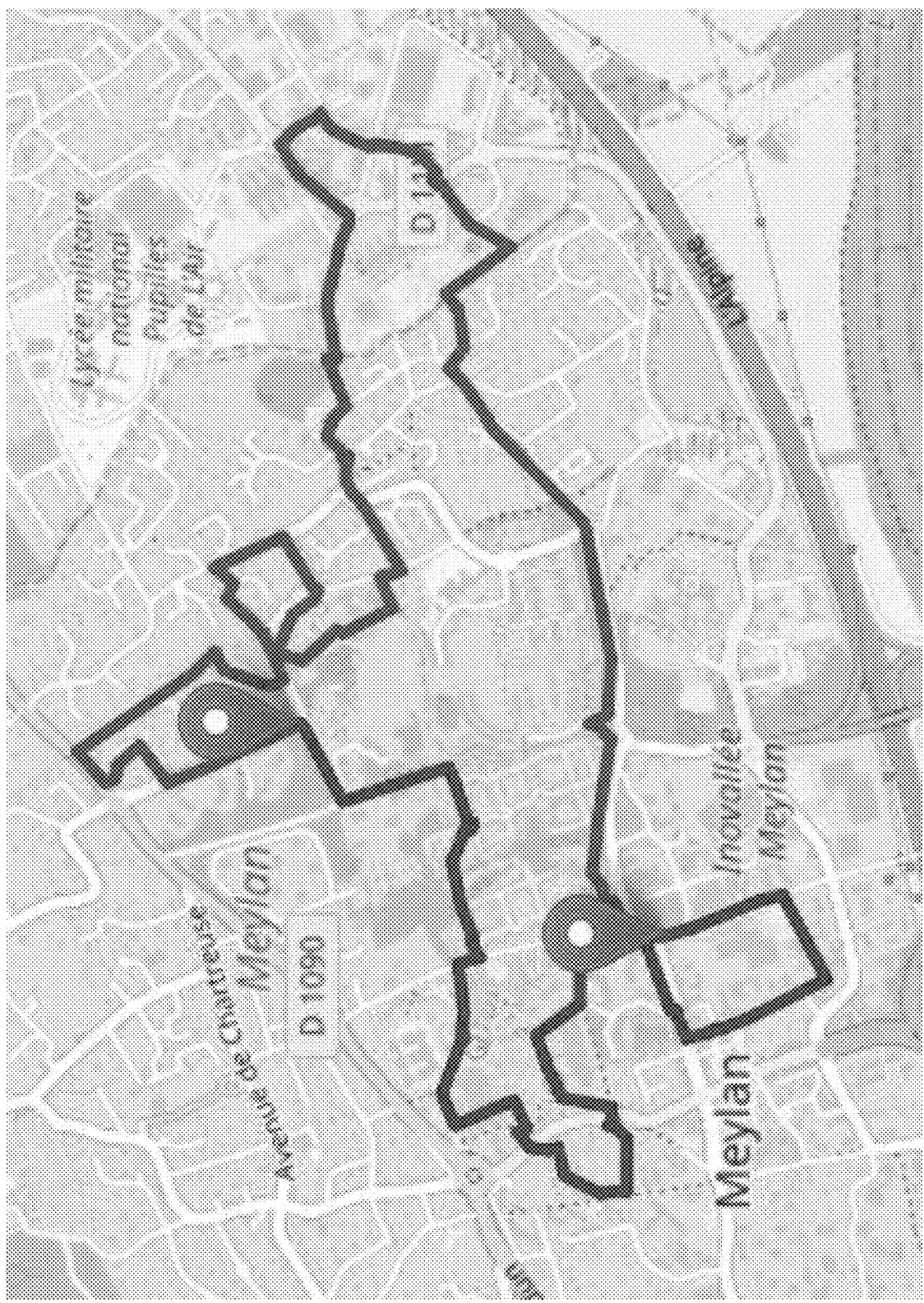
FIG. 26 is an example initial tour with an already completed section and a not yet completed section.
Figure 27:
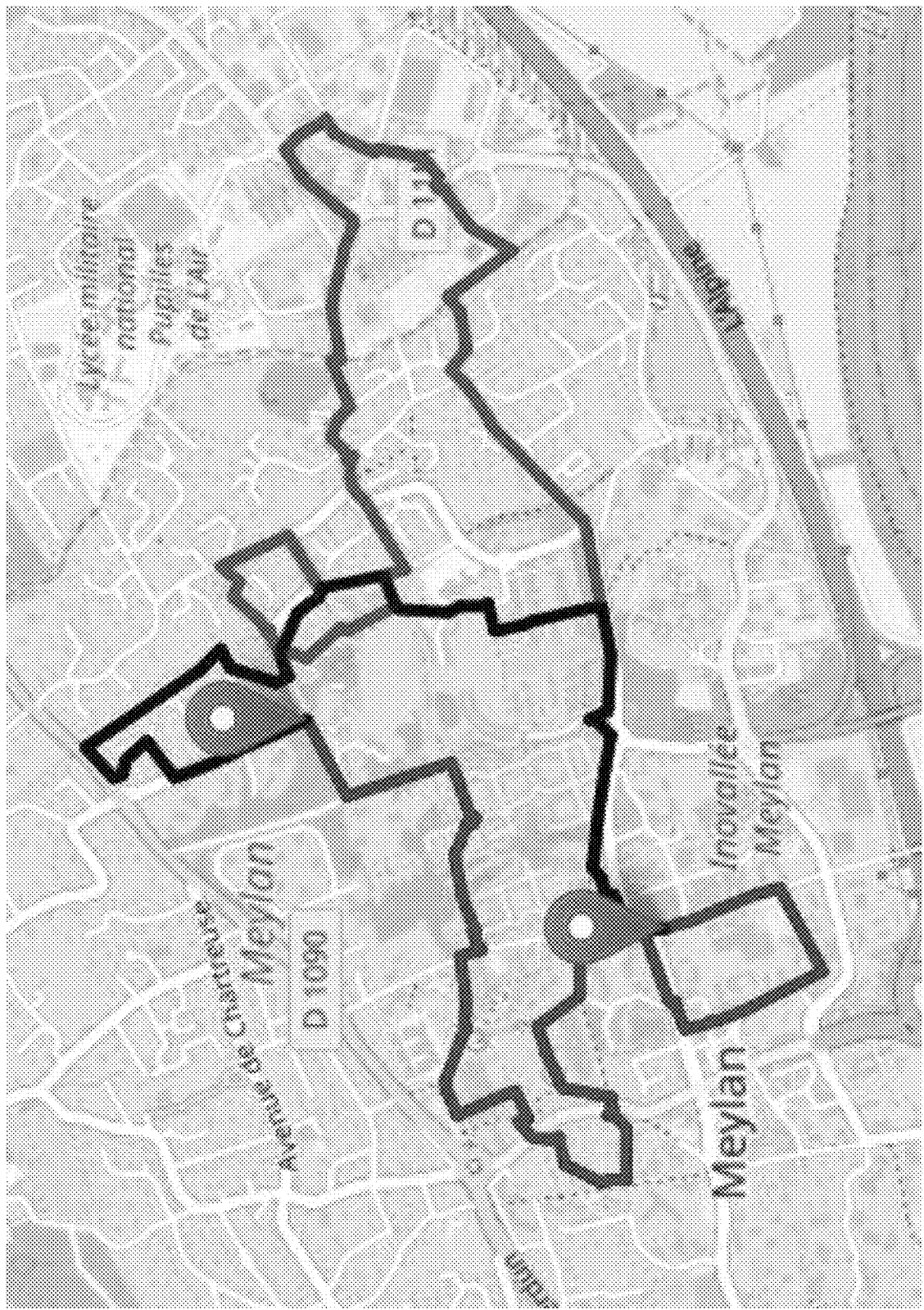
FIG. 27 is a new path generated in response to receipt of user input to decrease the length of the example tour of FIG. 26.

FIG. 26 includes an example initial tour (10 km) with the already completed section illustrated in blue (4 km) and the not yet completed section (6 km) in red. FIG. 27 includes a new path in black (3 km) generated in response to receipt of user input to decrease the length of the tour.

In various implementations, the user input may reduce the target distance to less than the already completed distance of the tour or include an indicator to return to the starting location as quickly as possible. In this example, the one or more processors determine the shortest possible path back to the starting location and transmits that path to the user device 14. If multiple paths have the shortest distance, the one or more processors may return the shortest path having the highest score to the user device 14.

Figure 28:
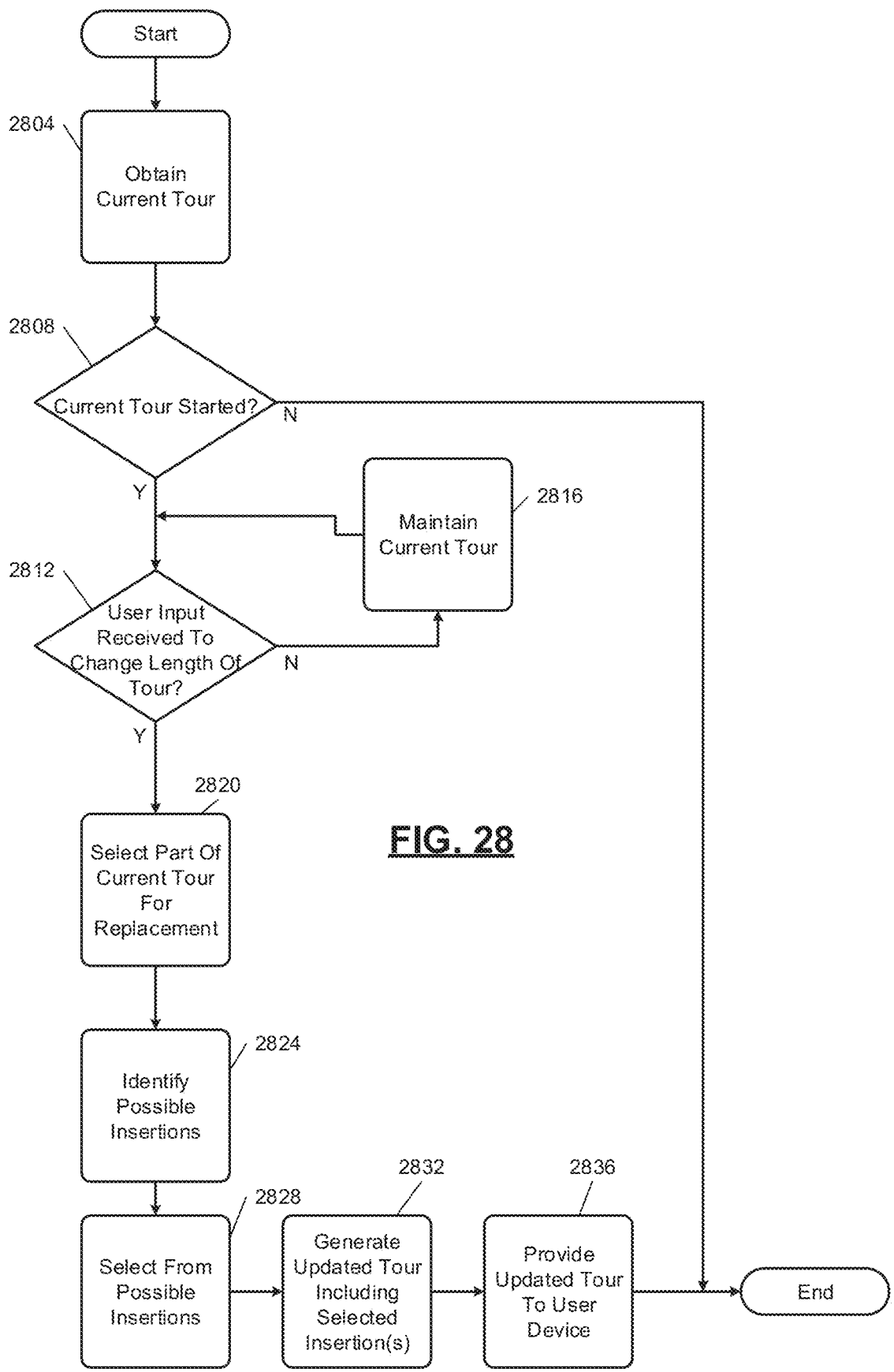
FIG. 28 is a flowchart depicting an example method of updating a tour.

FIG. 28 includes a flowchart depicting an example method of updating a tour. At 2804, the one or more processors (e.g., at least one of 61a and 61c) obtain the current tour provided to the user device 14. At 2808, the one or more processors determine whether the current tour provided to the user device 14 has begun. In other words, the one or more processors determine whether the user device 14 has begun to follow the current tour provided to the user device 14.

At 2812, the one or more processors determine whether user input has been received indicative of a request to change a length of the current tour, such as a change in the target distance or a change in a target period. If 2812 is false, the one or more processors maintain the current tour at 2816, and control returns to 2812. If 2812 is true, control continues with 2820.

At 2820, the one or more processors select a part of the current tour for replacement, as described above. At 2824, the one or more processors identify possible insertions in place of the part of the current tour, as described above. At 2828, the one or more processors select from the identified possible insertions, such as ones of the possible insertions having the highest scores and that most closely adjust the length of the tour to achieve the (changed) target distance and/or period.

At 2832, the one or more processors generate the updated tour including the selected insertion(s). At 2836, the one or more processors transmit the updated tour including the selected insertions(s) to the user device 14. The user device 14 outputs the updated tour to the user 14, such as via the display. While the example of FIG. 28 is shown as ending, control may return to 2804.

In view of the above, the one or more processors generate pedestrian tours without using previously collected user data regarding other pedestrian tours previously performed by users (e.g., traces of previous runs or walks performed by the requesting user or other users). This preserves user privacy and prevents the same or similar pedestrian tours from being generated numerous times. Additionally, previously collected user data may not be available in some locations, such as geographic areas limiting the collection and/or use of user data.

The term "pedestrian" as used herein includes those who are traveling on foot, whether walking or running, those traveling using any human powered vehicle (e.g., bike, skateboard, etc.), and those traveling using any non-human powered vehicle (e.g., electric-powered or gas-powered scooter, motorcycle, cart, car, etc.). Pedestrians may travel on roads, paths or off-road (e.g., on trails, paths, etc.), or a combination of them, (together generally referred to as a type of path) depending on how they are traveling.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer executable method of generating a pedestrian tour, comprising:
by one or more processors, receiving a query from a user device via a network, the query indicative of a request for a pedestrian tour and including (a) a location and (b) preferences including a target length for the pedestrian tour;
by the one or more processors, obtaining a graph of a geographical area around the location of the user device, the graph including nodes indicative of path crossings and arcs indicative of paths connecting pairs of the nodes;
by the one or more processors, determining scores for the arcs based on characteristics of the arcs, respectively, and the preferences;
by the one or more processors, selecting connecting ones of the arcs based on the scores of the connecting ones of the arcs, lengths of the selected connecting ones of the arcs, and the target length;
by the one or more processors, adding the selected connecting ones of the arcs to the pedestrian tour to initialize the pedestrian tour; and
by the one or more processors, transmitting the pedestrian tour to the user device via the network for display on a user interface.

2. The method of claim 1 wherein the selecting connecting ones of the arcs includes, by the one or more processors, selecting the connecting ones of the arcs such that the pedestrian tour begins at one location and ends at the one location.

3. The method of claim 1 wherein determining the scores for the arcs includes, by the one or more processors, increasing the scores of ones of the arcs corresponding to at least one of foot paths, residential paths, and pedestrian paths identified in an Open Street Map (OSM) database.

4. The method of claim 1 wherein determining the scores for the arcs includes, by the one or more processors, increasing the scores of ones of the arcs having a path type that is the same as a user defined type of path included in the preferences.

5. The method of claim 4 wherein determining the scores for the arcs includes, by the one or more processors, decreasing the scores of ones of the arcs having path types that are different than the user defined type of path included in the preferences.

6. The method of claim 1 wherein determining the scores for the arcs includes, by the one or more processors, increasing the scores of ones of the arcs located within a predetermined distance of at least one of parks, open spaces, scenic points of interest, and geographic formations identified in an Open Street Map (OSM) database.

7. The method of claim 1 wherein determining the scores for the arcs includes, by the one or more processors, increasing the scores of ones of the arcs located within a predetermined distance of at least one of rivers, mountains, and hiking trails identified in an Open Street Map (OSM) database.

8. The method of claim 1 wherein determining the scores for the arcs includes, by the one or more processors, decreasing the scores of ones of the arcs that are located within a predetermined distance of vehicular roads identified in an Open Street Map (OSM) database.

9. The method of claim 1 wherein determining the scores for the arcs includes, by the one or more processors, increasing the scores of ones of the arcs that pass a point of interest identified in an Open Street Map (OSM) database.

10. The method of claim 1 wherein determining the scores for the arcs includes, by the one or more processors, selectively decreasing the scores of two of the arcs based on an angle of intersection between the two arcs.

11. The method of claim 1 wherein determining the scores for the arcs includes, by the one or more processors, decreasing the score of one of the arcs based on the tour including the one of the arcs more than once.

12. The method of claim 1 wherein determining the scores for the arcs includes, by the one or more processors, decreasing the score of one of the arcs between two nodes based on the tour passing through one of the two nodes more than once.

13. The method of claim 1 wherein the selecting connecting ones of the arcs includes, by the one or more processors:
(a) selecting a first arc beginning at a first location and ending at an N-th location that is different than the first location;
(b) identifying nodes that are within a distance d of the N-th location;
(c) identifying arcs beginning at the N-th location and ending the nodes, respectively;
(d) selecting one of the identified arcs based on the scores of the identified arcs, wherein adding the selected connecting ones of the arcs includes adding the selected one of the identified arcs to the pedestrian tour; and
(e) repeating (b)-(d) until a length of the pedestrian tour is within a predetermined range of the target length included in the preferences.

14. The method of claim 13 further comprising, by the one or more processors, randomly selecting the distance d.

15. The method of claim 13 further comprising, by the one or more processors, increasing the distance d when zero nodes are located within the distance d of the N-th location.

16. The method of claim 13 wherein (d) selecting one of the identified arcs includes, by the one or more processors:
identifying k ones of the identified arcs having the k highest scores, where k is an integer greater than 1; and
randomly selecting the one of the identified arcs from the k ones of the identified arcs.

17. The method of claim 13 wherein (d) selecting one of the identified arcs includes, by the one or more processors, selecting the one of the identified arcs having the highest score.

18. The method of claim 1 further comprising, before the transmitting the pedestrian tour to the user device via the network, by the one or more processors:
selecting one of the selected connecting ones of the arcs;
identifying one or more replacement arcs for replacing the one of the selected connecting ones of the arcs; and
replacing the one of the selected connecting ones of the arcs with the one or more replacement arcs in the pedestrian tour.

19. The method of claim 18 wherein the identifying the one or more replacement arcs include identifying the one or more replacement arcs based on the scores of the one or more replacement arcs.

20. The method of claim 1 further comprising, before the transmitting the pedestrian tour to the user device via the network, by the one or more processors:
selecting a path segment between a first node and a second node, the path segment including one or more of the selected connecting ones of the arcs; and
selectively replacing the path segment with a shortest path segment between the first node and the second node based on a comparison of (a) with (b),
(a) being a first score of the shortest path segment divided by a first length of the shortest path segment; and
(b) being a second score of the path segment divided by a second length of the path segment.

21. The method of claim 20 wherein selectively replacing the path segment with the shortest path segment between the first node and the second node includes replacing the path segment with the shortest path segment between the first node and the second node when:
the second length of the path segment is greater than twice the first length of the shortest path segment;
the second score of the path segment is less than a first predetermined value* (a first sum of the scores the one or more of the selected connecting ones of the arcs of the path segment)* (a number of the one or more of the selected connecting ones of the arcs of the path segment); and
(a) is greater than a second predetermined value multiplied by (b).

22. The method of claim 1 wherein:
the preferences further include a target elevation gain; and
the determining the scores includes, by the one or more processors, determining the scores for the arcs based on elevation gains of the arcs and the target elevation gain.

23. The method of claim 1 wherein:
the preferences further include a maximum steepness; and
the determining the scores includes, by the one or more processors, determining the scores for the arcs based on steepnesses of the arcs and the maximum steepness.

24. The method of claim 1 further comprising, after transmitting the pedestrian tour to the user device via the network:
by the one or more processors, receiving a request from the user device via a network to adjust the target length of the pedestrian tour;
in response to the receipt of the request, based on the adjusted target length:
selecting at least one of the selected connecting ones of the arcs;
identifying one or more replacement arcs for replacing the at least one of the selected connecting ones of the arcs;
replacing the at least one of the selected connecting ones of the arcs with the one or more replacement arcs, thereby producing an updated pedestrian tour; and
transmitting the updated pedestrian tour to the user device via the network for display on the user interface.

25. The method of claim 24 wherein the receiving the request includes receiving the request after the user device has followed at least a portion of the pedestrian tour.

26. The method of claim 24 wherein the request includes a request to one of increase and decrease the target length.

27. The method of claim 24 wherein the selecting connecting ones of the arcs includes, selecting connecting ones of the arcs without user data regarding previously followed pedestrian tours.

28. The method of claim 1 further comprising:
by the one or more processors, determining at least one alternative arc to replace one of the selected connecting ones of the arcs; and
transmitting the at least one alternative arc to the user device for display with the pedestrian tour on the user interface.

29. The method of claim 28, wherein determining the at least one alternative arc comprises determining the at least one alternative arc before a beginning of the pedestrian tour.

30. The method of claim 28, wherein determining the at least one alternative arc comprises determining the at least one alternative arc in response to receipt of user input indicative of a request to adjust a target length of the pedestrian tour received during traversal of the pedestrian tour.

31. The method of claim 28 further comprising, by the user device, signaling with the absence or presence of one of a visual, audible, or haptic output in response to at least one of:
the user device entering the at least one alternative arc; and
the user device exiting the at least one alternative arc.

32. The method of claim 1 further comprising by the one or more processors, providing navigation related sensory discernable feedback using a sensory discernable output device to direct a user of the user device along the pedestrian tour.

33. A system for generating a pedestrian tour, comprising:
one or more processors; and
memory including code that, when executed by the one or more processors, performs functions including:
receiving a query from a user device via a network, the query indicative of a request for a pedestrian tour and including (a) a location and (b) preferences including a target length for the pedestrian tour;
obtaining a graph of a geographical area around the location of the user device, the graph including nodes indicative of path crossings and arcs indicative of paths connecting pairs of the nodes;
determining scores for the arcs based on characteristics of the paths, respectively, and the preferences;
selecting connecting ones of the arcs based on the scores of the connecting ones of the arcs, lengths of the selected connecting ones of the arcs, and the target length;
adding the selected connecting ones of the arcs to the pedestrian tour to initialize the pedestrian tour; and
transmitting the pedestrian tour to the user device via the network for display on a user interface.

34. A system for generating a pedestrian tour, comprising:
a means for receiving a query from a user device via a network, the query indicative of a request for a pedestrian tour and including (a) a location and (b) preferences including a target length for the pedestrian tour;
a means for:
obtaining a graph of a geographical area around the location of the user device, the graph including nodes indicative of path crossings and arcs indicative of paths connecting pairs of the nodes;
determining scores for the arcs based on characteristics of the paths, respectively, and the preferences;
selecting connecting ones of the arcs based on the scores of the connecting ones of the arcs, lengths of the selected connecting ones of the arcs, and the target length; and
adding the selected connecting ones of the arcs to the pedestrian tour to initialize the pedestrian tour; and
a means for transmitting the pedestrian tour to the user device via the network for display on a user interface.

* * * * *